(12) United States Patent
Culler et al.

(10) Patent No.: US 10,518,388 B2
(45) Date of Patent: Dec. 31, 2019

(54) COATED ABRASIVE ARTICLE MAKER APPARATUS

(71) Applicant: 3M INNOVATIVE PROPERTIES COMPANY, St. Paul, MN (US)

(72) Inventors: Scott R. Culler, Burnsville, MN (US); John T. Boden, White Bear Lake, MN (US); Steven J. Keipert, Houlton, WI (US); Negus B. Adefris, Woodbury, MN (US); Karan Jindal, Woodbury, MN (US); Aaron K. Nienaber, Maplewood, MN (US); David L. Morrison, St. Paul, MN (US); Peter T. Benson, North St. Paul, MN (US); Pratik Pranay, Minneapolis, MN (US); Bradford B. Wright, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 618 days.

(21) Appl. No.: 15/106,213

(22) PCT Filed: Dec. 22, 2014

(86) PCT No.: PCT/US2014/071855
§ 371 (c)(1),
(2) Date: Jun. 17, 2016

(87) PCT Pub. No.: WO2015/100220
PCT Pub. Date: Jul. 2, 2015

(65) Prior Publication Data
US 2016/0311081 A1  Oct. 27, 2016

Related U.S. Application Data

(60) Provisional application No. 61/919,999, filed on Dec. 23, 2013.

(51) Int. Cl.
*B24D 11/00* (2006.01)
*B24D 3/28* (2006.01)
(Continued)

(52) U.S. Cl.
CPC .............. *B24D 11/001* (2013.01); *B24D 3/28* (2013.01); *B24D 18/0072* (2013.01); *C09K 3/1436* (2013.01); *B24D 2203/00* (2013.01)

(58) Field of Classification Search
CPC ..... B24D 11/00; B24D 11/001; B24D 11/003; B24D 11/005; B24D 11/006; B29C 64/223; B41M 1/12
See application file for complete search history.

(56) References Cited

U.S. PATENT DOCUMENTS 1,910,444 A    5/1933  Nicholson
3,041,156 A    6/1962  Rowse
(Continued)

FOREIGN PATENT DOCUMENTS

EP        0 554 668       8/1993
WO    WO 2012/112305      8/2012

*Primary Examiner* — Timothy Kennedy
(74) *Attorney, Agent, or Firm* — Aleksander Medved

(57) ABSTRACT

A coated abrasive article maker apparatus including a first web path guiding a production tool such that it wraps a portion of the outer circumference of an abrasive particle transfer roll; a second web path for a resin coated backing guiding the resin coated backing such that it wraps a portion of the outer circumference of the abrasive particle transfer roll with the resin layer positioned facing the dispensing surface of the production tool this is positioned between the resin coated backing and the outer circumference of the abrasive particle transfer roll; and wherein abrasive particles are transferred from cavities in the production tool to the (Continued)

resin coated backing as the resin coated backing and the production tool traverse around the abrasive particle transfer roll.

16 Claims, 13 Drawing Sheets

(51) Int. Cl.
   *C09K 3/14* (2006.01)
   *B24D 18/00* (2006.01)

(56) References Cited

U.S. PATENT DOCUMENTS

| | | |
|---|---|---|
| 4,314,827 A | 2/1982 | Leitheiser |
| 4,623,364 A | 11/1986 | Cottringer |
| 4,652,275 A | 3/1987 | Bloecher |
| 4,744,802 A | 5/1988 | Schwabel |
| 4,770,671 A | 9/1988 | Monroe |
| 4,799,939 A | 1/1989 | Bloecher |
| 4,881,951 A | 11/1989 | Wood |
| 4,964,883 A | 10/1990 | Morris |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |
| 5,085,671 A | 2/1992 | Martin |
| 5,152,917 A | 10/1992 | Pieper |
| 5,164,348 A | 11/1992 | Wood |
| 5,201,916 A | 4/1993 | Berg |
| 5,213,591 A | 5/1993 | Celikkaya |
| 5,352,254 A | 10/1994 | Celikkaya |
| 5,366,523 A | 11/1994 | Rowenhorst |
| 5,435,816 A | 7/1995 | Spurgeon |
| 5,453,106 A | 9/1995 | Roberts |
| 5,453,296 A | 9/1995 | Lauritzen |
| 5,560,745 A | 10/1996 | Roberts |
| RE35,570 E | 7/1997 | Rowenhorst |
| 5,672,097 A | 9/1997 | Hoopman |
| 5,695,533 A | 12/1997 | Kardys |
| 5,714,259 A | 2/1998 | Holmes |
| 5,785,784 A * | 7/1998 | Chesley .......... B29C 59/025 156/231 |
| 5,946,991 A | 9/1999 | Hoopman |
| 5,975,987 A | 11/1999 | Hoopman |
| 5,984,988 A | 11/1999 | Berg |
| 6,129,540 A | 10/2000 | Hoopman |
| 6,521,004 B1 | 2/2003 | Culler |
| 6,669,745 B2 | 12/2003 | Prichard |
| 6,881,483 B2 | 4/2005 | McArdle |
| 8,034,137 B2 | 10/2011 | Erickson |
| 8,142,531 B2 | 3/2012 | Adefris |
| 8,142,532 B2 | 3/2012 | Erickson |
| 8,142,891 B2 | 3/2012 | Culler |
| 2004/0235406 A1 | 11/2004 | Duescher |
| 2005/0081455 A1 | 4/2005 | Welygan |
| 2005/0274770 A1 | 12/2005 | Henderson, Sr. |
| 2009/0165394 A1 | 7/2009 | Culler |
| 2009/0169816 A1 | 7/2009 | Erickson |
| 2010/0146867 A1 | 6/2010 | Boden |
| 2011/0289855 A1 | 12/2011 | Axinte |
| 2012/0227333 A1 | 9/2012 | Adefris |
| 2013/0040537 A1 | 2/2013 | Schwabel |
| 2013/0125477 A1 | 5/2013 | Adefris |
| 2013/0212952 A1 | 8/2013 | Welygan |
| 2013/0312337 A1 | 11/2013 | Moren |

* cited by examiner

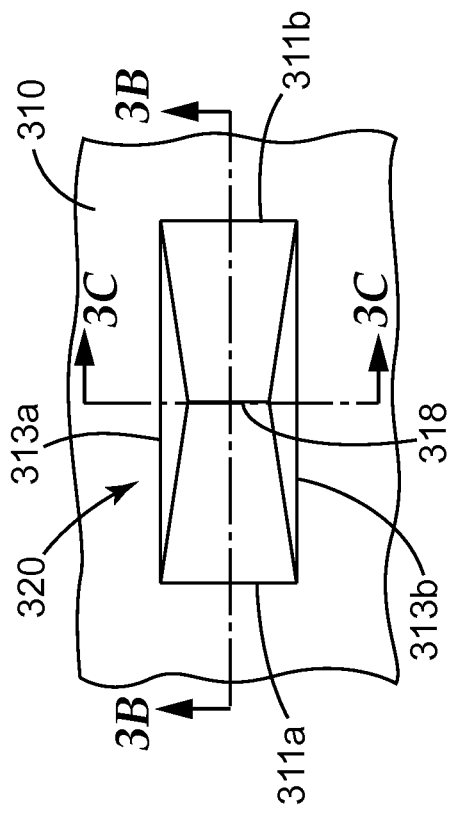
FIG. 3A
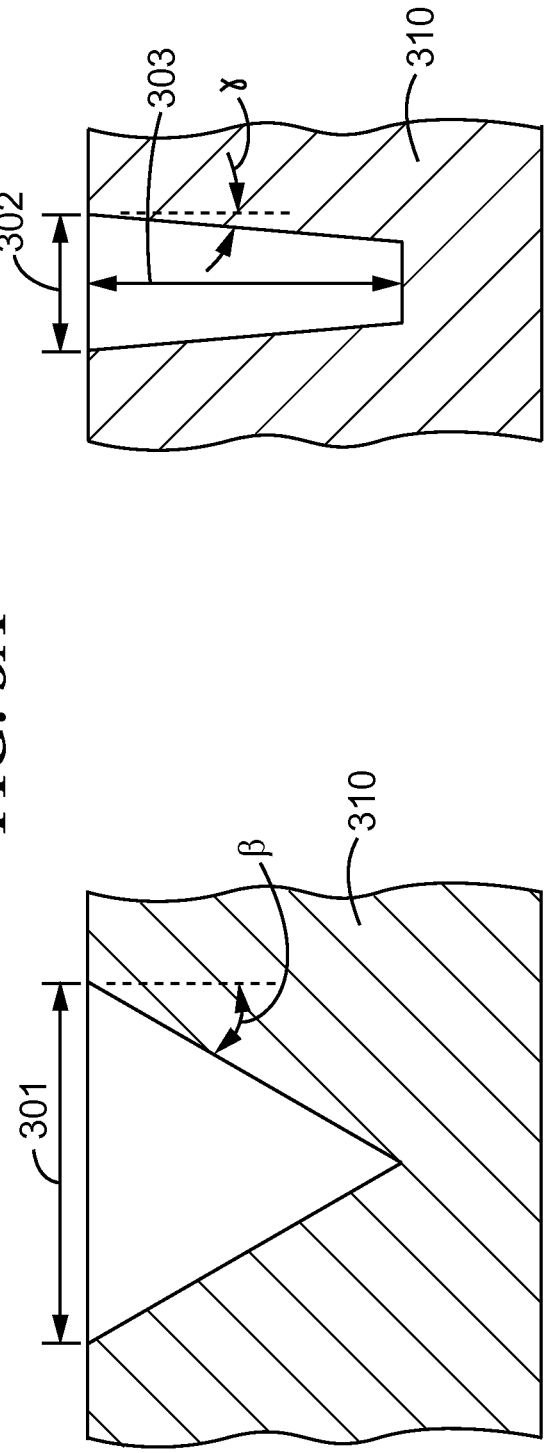
FIG. 3C
FIG. 3B

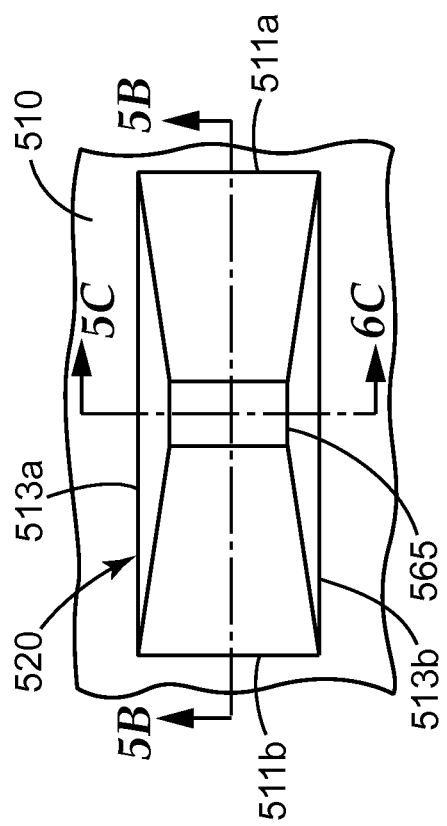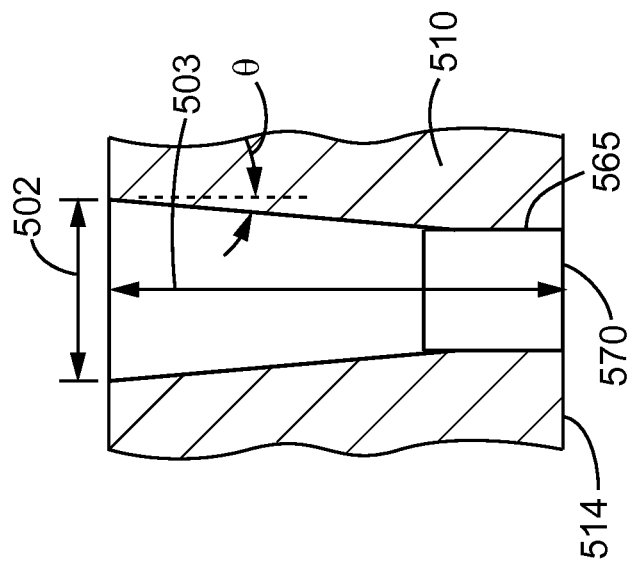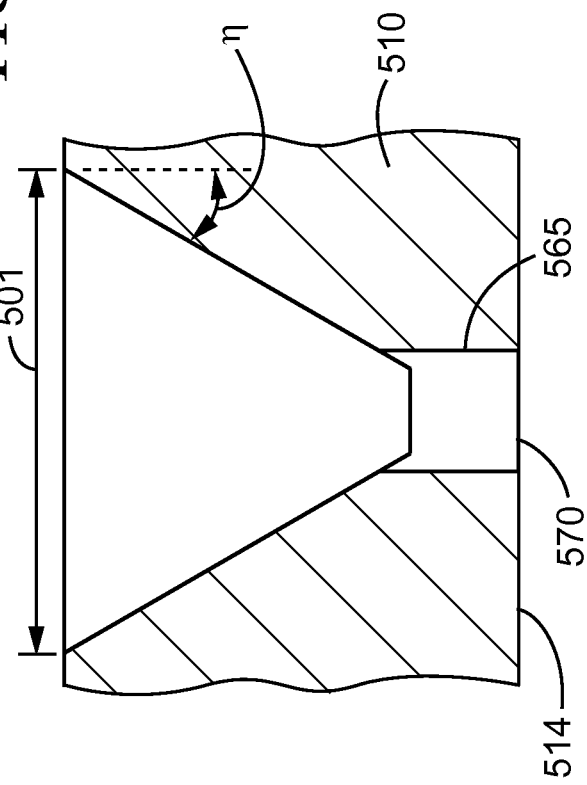
FIG. 5A
FIG. 5C
FIG. 5B

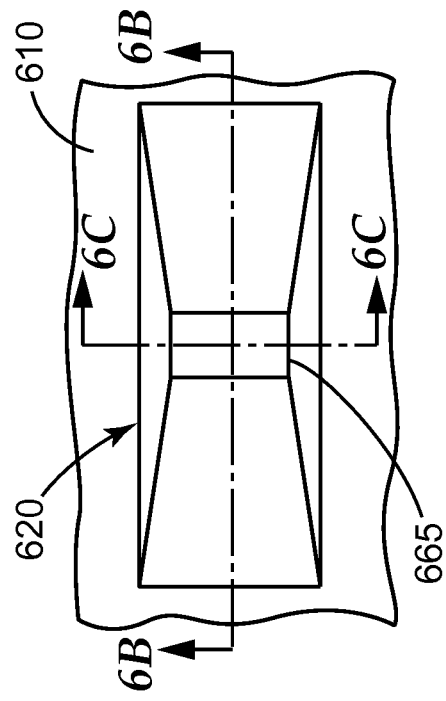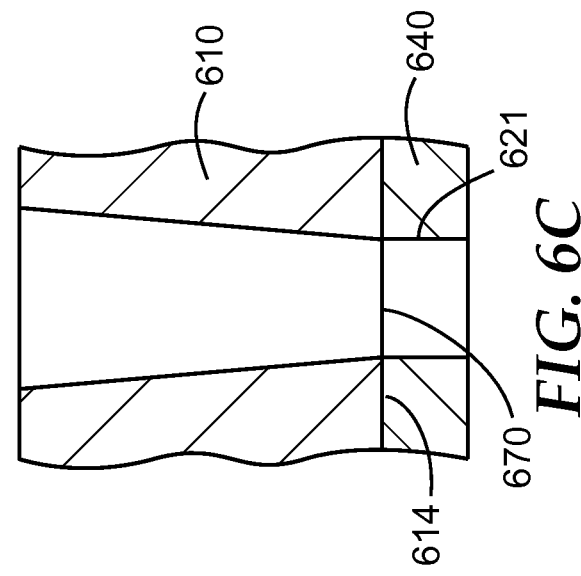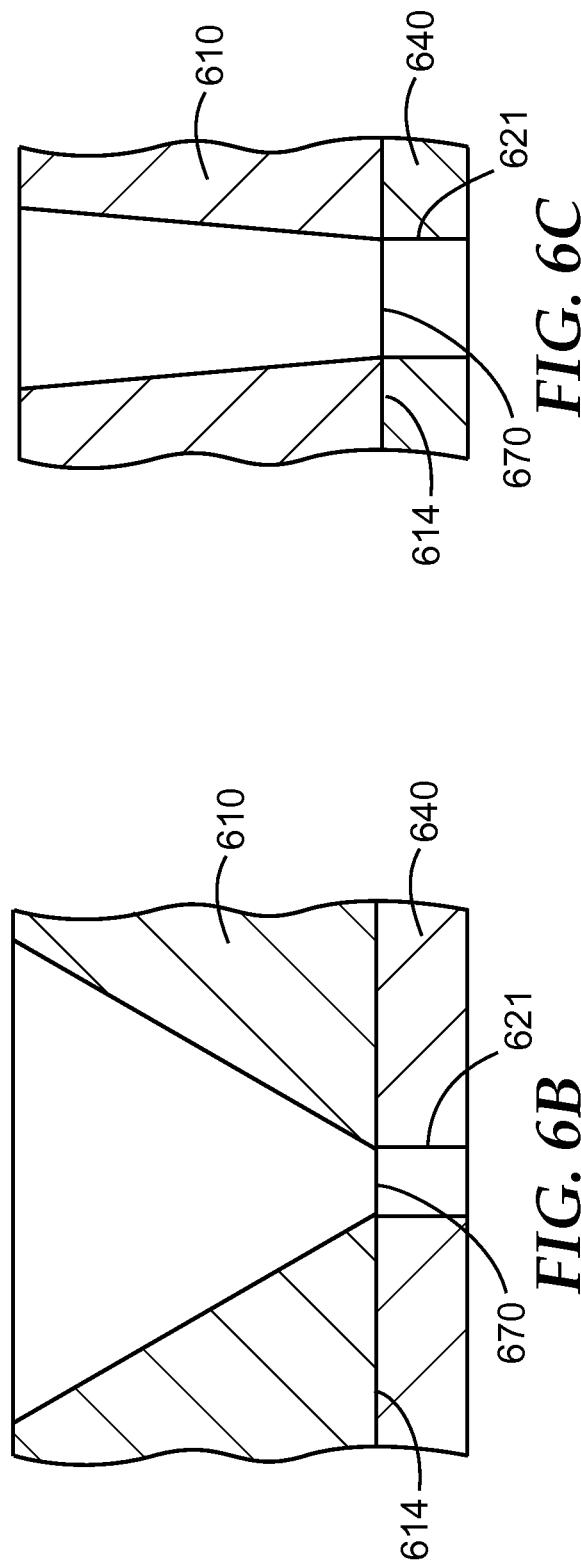

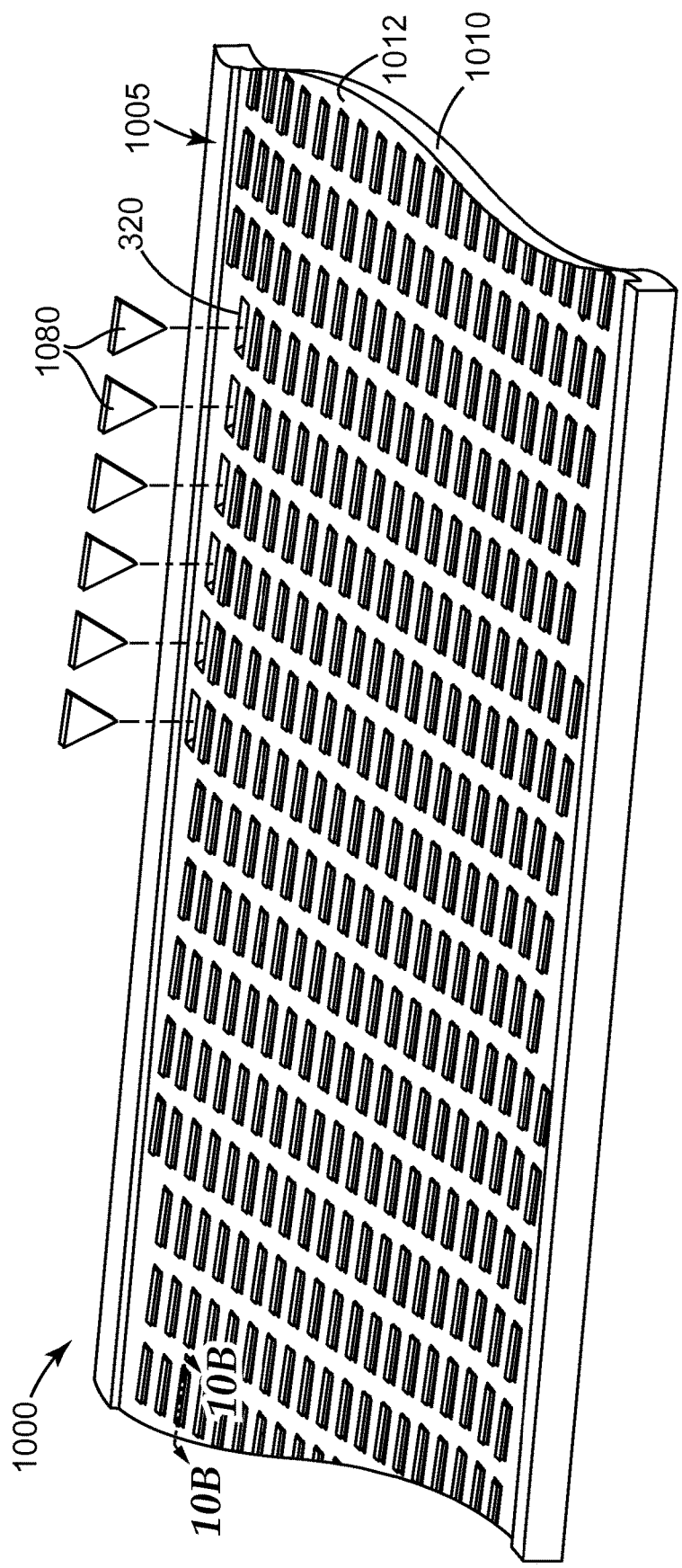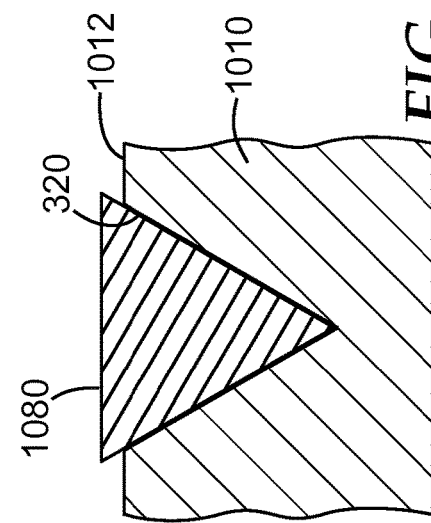
FIG. 10A
FIG. 10B

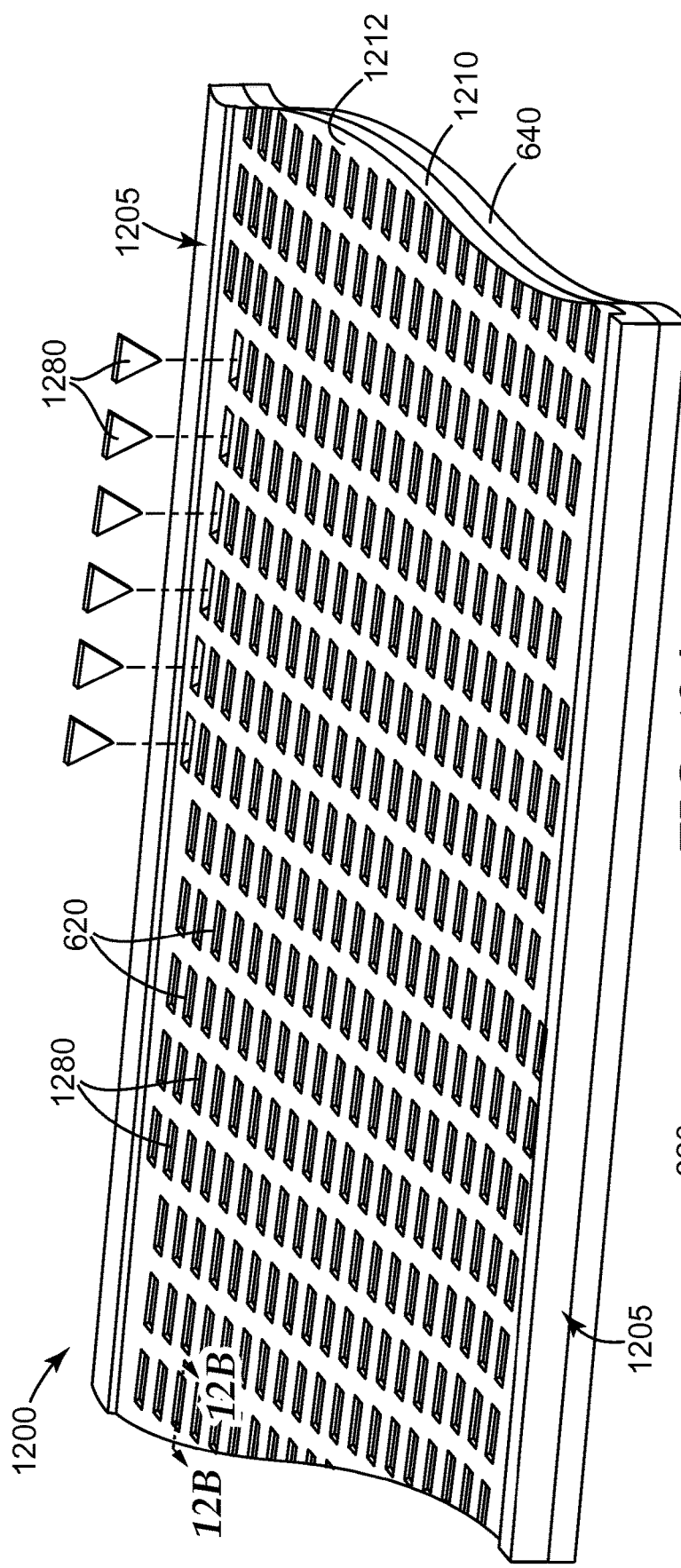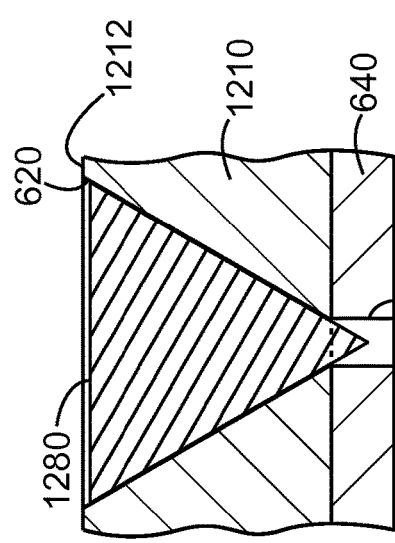
FIG. 12A
FIG. 12B

COATED ABRASIVE ARTICLE MAKER APPARATUS

CROSS REFERENCE TO RELATED APPLICATIONS

This application is a national stage filing under 35 U.S.C. 371 of PCT/US2014/071855 filed Dec. 22, 2014, which claims the benefit of U.S. Provisional Patent Application No. 61/919,999, filed Dec. 23, 2013, the disclosures of which are incorporated by reference in their entirety herein.

TECHNICAL FIELD

The present disclosure broadly relates to abrasive particles and methods of using them to make various articles.

BACKGROUND

Coated abrasive articles are conventionally coated by either drop coating or electrostatic coating of the abrasive particles onto a resin-coated backing. Of the two methods, electrostatic coating has been often preferred, as it provides some degree of orientation control for grains having an aspect ratio other than one. In general, positioning and orientation of the abrasive particles and their cutting points is important in determining abrasive performance.

PCT International Publ. No. WO 2012/112305 A2 (Keipert) discloses coated abrasive articles manufactured through use of precision screens having precisely spaced and aligned non-circular apertures to hold individual abrasive particles in fixed positions that can be used to rotationally align a surface feature of the abrasive particles in a specific z-direction rotational orientation. In that method, a screen or perforated plate is laminated to an adhesive film and loaded with abrasive particles. The orientation of the abrasive particles could be controlled by the screen geometry and the restricted ability of the abrasive particles to contact and adhere to the adhesive through the screen openings. Removal of the adhesive layer from the filled screen transferred the oriented abrasive particles in an inverted fashion to an abrasive backing. The method relies on the presence of adhesive which may be cumbersome, prone to detackifying (e.g., due to dust deposits) over time, and which may transfer to the resultant coated abrasive article creating the possibility of adhesive transfer to, and contamination of, a workpiece.

SUMMARY

For triangular abrasive particles, inverted (base up) abrasive particles typically have a negative impact on the cut and life of the abrasive article, especially on metals such as stainless steel. Due to the high bearing area leading to low local pressure and poor fracture of these inverted abrasive particles, metal capping occurs, which leads to a premature end of cut life. In conventional coated abrasive products, the fraction of inverted abrasive particles is primarily a function of the mineral coat weight, and it is difficult to achieve high mineral coverage without inverted abrasive particles. This necessitates the use of very open coat constructions often with sub-optimum performance.

The orientation of abrasive particles with respect to the cutting direction is also important. The cutting efficiency and abrasive particle fracture mechanism varies with orientation. With triangular shaped abrasive particles, for improved cut and breakdown, it is generally preferred that the abrasive article and/or workpiece relative motion is such that the edge of the triangle is presented in the motion of cutting instead of the triangle's face. If the triangular face is presented to the direction of cutting, often the triangle will fracture near the base and out of the plane of grinding.

The spacing of the abrasive particles in an abrasive article can also be important. Conventional methods such as drop coating and electrostatic deposition provide a random distribution of spacing and grain clustering often results where two or more shaped abrasive particles end up touching each other near the tips or upper surfaces of the shaped abrasive particles. Clustering leads to poor cutting performance due to local enlargement of bearing areas in those regions and inability of the shaped abrasive particles in the cluster to fracture and breakdown properly during use because of mutual mechanical reinforcement. Clustering creates undesirable heat buildup compared to coated abrasive articles having more uniformly spaced shaped abrasive particles.

In view of the above, it would be desirable to have alternative methods and apparatus that are useful for positioning and orienting abrasive particles (especially shaped abrasive particles) in coated abrasive articles that are simple and cost-effective.

The present disclosure provides practical solutions to the above-described need, whereby the screen of WO 2012/112305 A2 (Keipert) has been replaced with a precisely-replicated web or tooling with cavities that are complementary in shape and size to the abrasive particles being coated. This complementary shape greatly improves the propensity of the abrasive particle to fill and be retained by the cavities in high speed manufacturing. This allows for the elimination of the adhesive layer that is present in WO 2012/112305 A2 (Keipert), greatly simplifying the coating process.

In one embodiment the invention resides in a coated abrasive article maker apparatus including:
- a first web path for a production tool having a dispensing surface with a plurality of cavities, the first web path guiding the production tool through the coated abrasive article maker apparatus such that it wraps a portion of the outer circumference of an abrasive particle transfer roll;
- a second web path for a resin coated backing guiding the resin coated backing through the coated abrasive article maker apparatus such that it wraps a portion of the outer circumference of the abrasive particle transfer roll with the resin layer positioned facing the dispensing surface and the production tool positioned between the resin coated backing and the outer circumference of the abrasive particle transfer roll; and
- an abrasive particle feeder, positioned prior to the abrasive particle transfer roll in the direction of travel of the production tool along the first web path, to dispense abrasive particles onto the dispensing surface and into the plurality of cavities; and
- wherein abrasive particles are transferred from the plurality of cavities to the resin coated backing as the resin coated backing and the production tool traverse around the abrasive.

In another embodiment the invention resides in a coated abrasive article maker apparatus including:
- a production tool having a dispensing surface with a plurality of cavities located on the outer circumference of an abrasive particle transfer roll;
- a web path for a resin coated backing guiding the resin coated backing through the coated abrasive article maker apparatus such that it wraps a portion of the outer circumference of the abrasive particle transfer roll with the resin layer positioned facing the dispensing surface; and an abrasive particle feeder, to dispense abrasive particles onto the dispensing surface and into the plurality of cavities; and wherein abrasive particles are transferred from the plurality of cavities to the resin coated backing as they traverse around the abrasive particle transfer roll.

As used herein, the term "precisely-shaped" in reference to abrasive particles or cavities in a carrier member respectively refers to abrasive particles or cavities having three-dimensional shapes that are defined by relatively smooth-surfaced sides that are bounded and joined by well-defined sharp edges having distinct edge lengths with distinct endpoints defined by the intersections of the various sides.

As used herein, the term "removably and completely disposed within" in reference to a cavity means that the abrasive particle is removable from the cavity by means of gravity alone, although in practice other forces may be used (e.g., air pressure or vacuum).

Features and advantages of the present disclosure will be further understood upon consideration of the detailed description as well as the appended claims.

BRIEF DESCRIPTION OF THE DRAWINGS

FIG. 3A is an enlarged schematic top view of an exemplary cavity 320 design suitable for use as cavities 220 in production tool 200.

FIG. 3B is cross-sectional view of FIG. 3A taken along plane 3B-3B.

FIG. 3C is a cross-sectional view of FIG. 3A taken along plane 3C-3C.

FIG. 5A is an enlarged schematic top view of an exemplary cavity 520 design suitable for use as cavities 220 in production tool 200.

FIG. 5B is a schematic cross-sectional view of exemplary cavity 520 shown in FIG. 5A taken along plane 5B-5B.

FIG. 5C is a schematic cross-sectional view of exemplary cavity 520 shown in FIG. 5A taken along plane 5C-5C.

FIG. 6A is an enlarged schematic top view of an exemplary cavity 620 design suitable for use as cavities 220 in production tool 200.

FIG. 6B is a schematic cross-sectional view of FIG. 6A taken along plane 6B-6B.

FIG. 6C is a schematic cross-sectional view of FIG. 6A taken along plane 6C-6C.

FIG. 10A is a schematic partially-exploded perspective view of an exemplary perspective view of an abrasive particle positioning system 1000 according to one exemplary embodiment of the present disclosure.

FIG. 10B is a schematic cross-sectional side view of abrasive particle positioning system 1000 taken along plane 10B-10B.

FIG. 12A is a schematic partially-exploded perspective view of an exemplary perspective view of an abrasive particle positioning system 1200 according to one exemplary embodiment of the present disclosure.

FIG. 12B is a schematic cross-sectional side view of abrasive particle positioning system 1200 taken along plane 12B-12B.

Figure 1A:
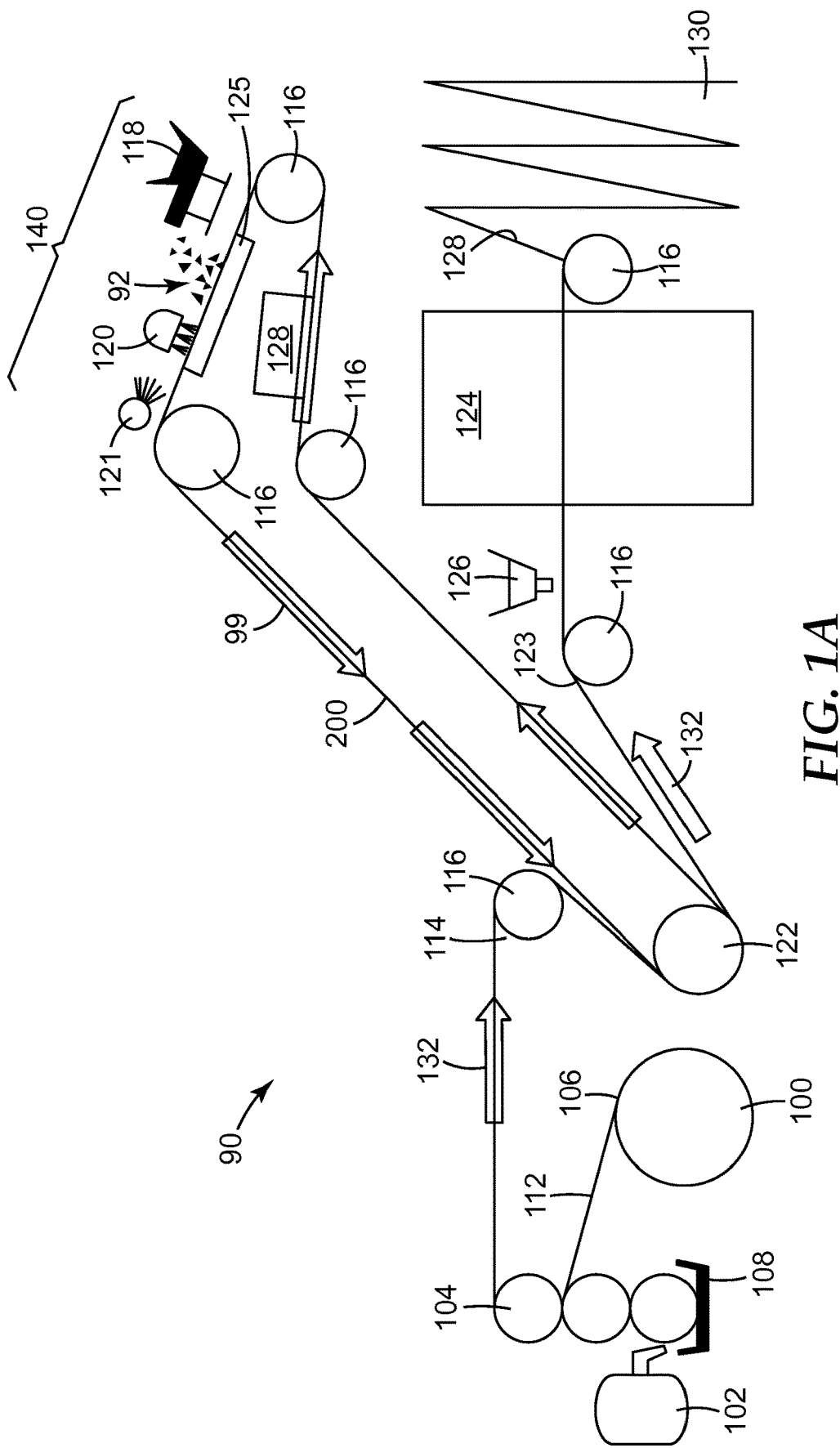
FIG. 1A is schematic view of an apparatus for making a coated abrasive article according to the present disclosure.

Repeated use of reference characters in the specification and drawings is intended to represent the same or analogous features or elements of the disclosure. It should be understood that numerous other modifications and embodiments can be devised by those skilled in the art which fall within the scope and spirit of the principles of the disclosure. The figures may not be drawn to scale.

DETAILED DESCRIPTION

Coated Abrasive Article Maker Apparatus

Figure 2:
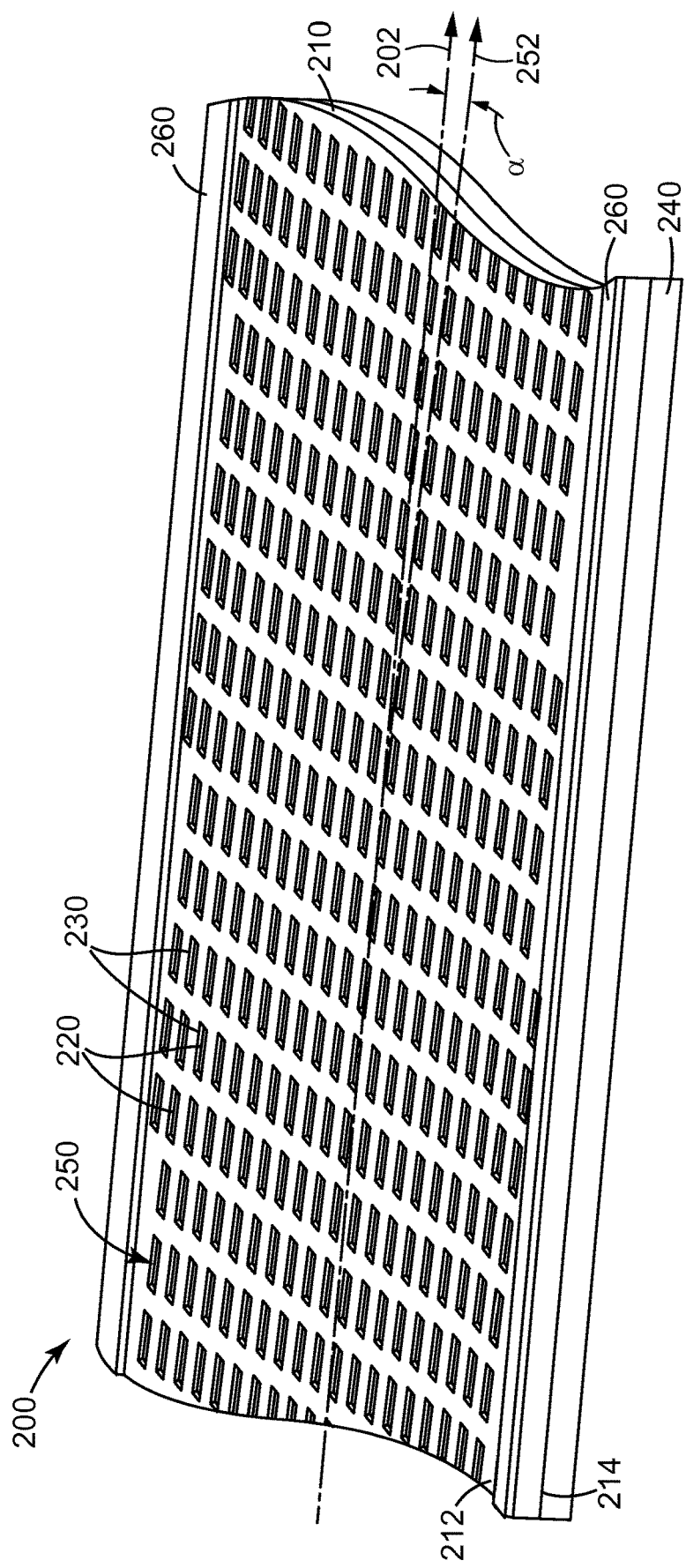
FIG. 2 is a schematic perspective view of an exemplary production tool 200 according to the present disclosure.

Referring now to FIG. 1A, and FIG. 2, a coated abrasive article maker apparatus 90 according to the present disclosure includes abrasive particles 92 removably disposed within cavities 220 of a production tool 200 having a first web path 99 guiding the production tool through the coated abrasive article maker such that it wraps a portion of an outer circumference of an abrasive particle transfer roll 122. The apparatus typically includes, for example, an unwind 100, a make coat delivery system 102, and a make coat applicator 104. These components unwind a backing 106, deliver a make coat resin 108 via the make coat delivery system 102 to the make coat applicator 104 and apply the make coat resin to a first major surface 112 of the backing. Thereafter the resin coated backing 114 is positioned by an idler roll 116 for application of the abrasive particles 92 to the first major surface 112 coated with the make coat resin 108. A second web path 132 for the resin coated backing 114 guides the resin coated backing through the coated abrasive article maker apparatus such that it wraps a portion of the outer circumference of the abrasive particle transfer roll 122 with the resin layer positioned facing the dispensing surface of the production tool that is positioned between the resin coated backing 114 and the outer circumference of the abrasive particle transfer roll 122. Suitable unwinds, make coat delivery systems, make coat resins, coaters and backings are known to those of skill in the art. The make coat delivery system 102 can be a simple pan or reservoir containing the make coat resin or a pumping system with a storage tank and delivery plumbing to translate the make coat resin to the needed location. The backing 106 can be a cloth, paper, film, nonwoven, scrim, or other web substrate. The make coat applicator can be, for example, a coater, a roll coater, a spray system, or a rod coater. Alternatively, a pre-coated coated backing can be positioned by the idler roll 116 for application of the abrasive particles to the first major surface.

As described herein later, the production tool 200 comprises a plurality of cavities 220 having a complimentary shape to the intended abrasive particle to be contained therein. An abrasive particle feeder 118 supplies at least some abrasive particles to the production tool. Preferably, the abrasive particle feeder 118 supplies an excess of abrasive particles such that there are more abrasive particles present per unit length of the production tool in the machine direction than cavities present. Supplying an excess of abrasive particles helps to ensure all cavities within the production tool are eventually filled with an abrasive particle. Since the bearing area and spacing of the abrasive particles is often designed into the production tooling for the specific grinding application it is desirable to not have too many unfilled cavities. The abrasive particle feeder 118 is typically the same width as the production tool and supplies abrasive particles across the entire width of the production tool. The abrasive particle feeder 118 can be, for example, a vibratory feeder, a hopper, a chute, a silo, a drop coater, or a screw feeder.

Optionally, a filling assist member 120 is provided after the abrasive particle feeder 118 to move the abrasive particles around on the surface of the production tool 200 and to help orientate or slide the abrasive particles into the cavities 220. The filling assist member 120 can be, for example, a doctor blade, a felt wiper, a brush having a plurality of bristles, a vibration system, a blower or air knife, a vacuum box 124, or combinations thereof. The filling assist member moves, translates, sucks, or agitates the abrasive particles on the dispensing surface 212 (top or upper surface of the production tool 200 in FIG. 1A) to place more abrasive particles into the cavities. Without the filling assist member, generally at least some of abrasive particles dropped onto the dispensing surface 212 will fall directly into a cavity and no further movement is required but others may need some additional movement to be directed into a cavity. Optionally, the filling assist member 120 can be oscillated laterally in the cross machine direction or otherwise have a relative motion such as circular or oval to the surface of the production tool 200 using a suitable drive to assist in completely filling each cavity 220 in the production tool with an abrasive particle. Typically if a brush is used as the filling assist member, the bristles may cover a section of the dispensing surface from 2-4 inches (5.0-10.2 cm) in length in the machine direction preferably across all or most all of the width of the dispensing surface, and lightly rest on or just above the dispensing surface, and be of a moderate flexibility. A vacuum box 125, if used as the filling assist member, is often used in conjunction with a production tool having cavities extending completely through the production tooling as shown in FIG. 5; however, even a production tool having a solid back surface 314 as seen in FIG. 3 can be an advantage since it will flatten and draw the production tooling more planar for improved filling of the cavities. The vacuum box 125 is located near the abrasive particle feeder 118 and may be located before or after the abrasive particle feeder, or encompass any portion of a web span between a pair of idler rolls 116 in the abrasive particle filling and excess removal section of the apparatus generally illustrated at 140. Alternatively, the production tool can be supported or pushed on by a shoe or a plate to assist in keeping it planar in this section of the apparatus instead or in addition to the vacuum box 125. In embodiments, where the abrasive particle is fully contained within the cavity of the production tooling such as FIG. 11B, that is to say where the majority (e.g., 80, 90, or 95 percent) of the abrasive particles in the cavities do not extend past the dispensing surface of the production tooling, it is easier for the filling assist member to move the abrasive particles around on the dispensing surface of the production tooling without dislodging an individual abrasive particle already contained within an individual cavity.

Optionally, as the production tool advances in the machine direction, the cavities 220 move to a higher elevation and can optionally reach a higher elevation than the abrasive particle feeder's outlet for dispensing abrasive particles onto the dispensing surface of the production tool. If the production tool is an endless belt, the belt can have a positive incline to advance to a higher elevation as it moves past the abrasive particle feeder 118. If the production tool is a roll, the abrasive particle feeder 118 can be positioned such that it applies the abrasive particles to the roll before top dead center of the roll's outer circumference such as between 270 degrees to 350 degrees on the face of the roll with top dead center being 0 degrees as one progresses clockwise about the roll with the roll turning in a clockwise in operation. It is believed that applying the abrasive particles to an inclined dispensing surface 212 of the production tool can enable better filling of the cavities. The abrasive particles can slide or tumble down the inclined dispensing surface 212 of the production tool thereby enhancing the possibility of falling into a cavity. In embodiments, where the abrasive particle is fully contained within the cavity of the production tooling such as FIG. 11B, that is to say where the majority (e.g., 80, 90, or 95 percent) of the abrasive particles in the cavities do not extend past the dispensing surface of the production tooling, the incline can also assist in removing excess abrasive particles from the dispensing surface of the production tooling since excess abrasive particles can slide off the dispensing surface of the production tooling towards the incoming end. The incline may be between zero degrees up to an angle where the abrasive particles begin to fall out of the cavities. The preferred incline will depend on the abrasive particle shape and the magnitude of the force (e.g., friction or vacuum) holding the abrasive particle in the cavity. In some embodiments, the positive incline is in a range of from +10 to +80 degrees, or from +10 to +60 degrees, or from +10 to +45 degrees.

Optionally, an abrasive particle removal member 121 can be provided to assist in removing the excess abrasive particles from the surface of the production tooling 200 once most or all of the cavities have been filled by an abrasive particle. The abrasive particle removal member can be, for example, a source of air to blow the excess abrasive particles off the dispensing surface of the production tooling such as an air wand, air shower, air knife, a coanda effect nozzle, or a blower. A contacting device can be used as the abrasive particle removal member such as a brush, a scraper, a wiper, or a doctor blade. A vibrator, such as an ultrasonic horn, can be used as the abrasive particle removal member. Alternatively, a vacuum source such as vacuum box or vacuum roll located along a portion of the first web path after the abrasive particle feeder 118 with a production tool having cavities extending completely through the production tool as shown in FIG. 5 can be used to hold the abrasive particles in the cavities. In this span or section of the first web path, the dispensing surface of the production tool can be inverted or have a large incline or decline approaching or exceeding 90 degrees to remove the excess abrasive particles using the force of gravity to slide or drop them from the dispensing surface while retaining the abrasive particles disposed in the cavities by vacuum until the dispensing surface is returned to an orientation to keep the abrasive particles in the cavities due to the force of gravity or they are released from the cavities onto the resin coated backing. In embodiments, where the abrasive particle is fully contained within the cavity of the production tooling such as FIG. 11B, that is to say where the majority (e.g., 80, 90, or 95 percent) of the abrasive particles in the cavities do not extend past the dispensing surface of the tooling, the abrasive particle removal member 121 can slide the excess abrasive particles across the dispensing surface of the production tooling and off of the production tool without disturbing the abrasive particles contained within the cavities. The removed excess abrasive particles can be collected and returned to the abrasive particle feeder for reuse. The excess abrasive particles can alternatively be moved in a direction opposite to the direction of travel of the production tool past or towards the abrasive particle feeder where they may fill unoccupied cavities.

After leaving the abrasive particle filling and excess removal section of the apparatus generally illustrated at 140, the abrasive particles in the production tool 220 travel towards the resin coated backing 114. The elevation of the production tooling in this section is not particularly important as long as the abrasive particles are retained in the cavities and the production tool could continue to incline, decline, or travel horizontally. Choice of the positioning is often determined by existing space within the machine if retrofitting an existing abrasive maker. An abrasive particle transfer roll 122 is provided and the production tooling 220 often wraps at least a portion of the roll's circumference. In some embodiments, the production tool wraps between 30 to 180 degrees, or between 90 to 180 degrees of the outer circumference of the abrasive particle transfer roll. The resin coated backing 114 often also wraps at least a portion of the roll's circumference such that the abrasive particles in the cavities are transferred from the cavities to the resin coated backing as both traverse around the abrasive particle transfer roll 122 with the production tooling 220 located between the resin coated backing and the outer surface of the abrasive particle transfer roll with the dispensing surface of the production tooling facing and generally aligned with the resin coated first major surface of the backing. The resin coated backing often wraps a slightly smaller portion of the abrasive particle transfer roll than the production tooling. In some embodiments, the resin coated backing wraps between 40 to 170 degrees, or between 90 to 170 degrees of the outer circumference of the abrasive particle transfer roll. Preferably the speed of the dispensing surface and the speed of the resin layer of the resin coated backing are speed matched to each other within ±10 percent, ±5 percent, or ±1 percent, for example.

Various methods can be employed to transfer the abrasive particles from cavities of the production tool to the resin coated backing. In no particular order the various methods are:

1. Gravity assist where the production tooling and dispensing surface is inverted for a portion of its machine direction travel and the abrasive particles fall out of the cavities under the force of gravity onto the resin coated backing. Typically in this method, the production tooling has two lateral edge portions with standoff members 260 (FIG. 2) located on the dispensing surface 212 and that contact the resin coated backing at two opposed edges of the backing where resin has not been applied to hold the resin layer slightly above the dispensing surface of the production tooling as both wrap the abrasive particle transfer roll. Thus, there is a gap between the dispensing surface and the top surface of the resin layer on the resin coated backing so as to avoid transferring any resin to the dispensing surface of the production tooling. In one embodiment, the resin coated backing has two edge strips free of resin and a resin coated middle section while the dispensing surface can have two raised ribs extending in the longitudinal direction of the production tooling for contact with the resin free edges of the backing In another embodiment, the abrasive particle transfer roll can have two raised ribs or rings on either end of the roll and a smaller diameter middle section with the production tooling contained within the smaller diameter middle section of the abrasive particle transfer roll as it wraps the abrasive particle transfer roll. The raised ribs or end rings on the abrasive particle transfer roll elevate the resin layer of the resin coated backing above the dispensing surface such that there is a gap between the two surfaces. Alternatively, raised posts distributed on the production tooling surface may be used to maintain the gap between the two surfaces. Alternatively, a prior application of (typically large) particles may be applied to the resin coating that maintains a gap between the resin coated backing and the dispensing surface. In yet another embodiment, the dispensing surface can be spaced apart from the resin coated backing, thereby maintaining a gap without any contact between the dispensing surface and the resin coated backing.

2. Pushing assist where each cavity in the production tooling has two open ends such that the abrasive particle can reside in the cavity with a portion of the abrasive particle extending past the back surface 214 of the production tooling. With push assist the production tooling no longer needs to be inverted but it still may be inverted. As the production tooling wraps the abrasive particle transfer roll, the roll's outer surface engages with the abrasive particle in each cavity and pushes the abrasive particle out of the cavity and into the resin layer on the resin coated backing. In some embodiments, the outer surface of the abrasive particle transfer roll comprises a resilient compressible layer with hardness Shore A durometer of, for example, 20-70, applied to provide additional compliance as the abrasive particle pushes into the resin coated backing. In another embodiment of pushing assist, the back surface of the production tooling can be covered with a resilient compressible layer as shown in FIG. 12A instead of or in addition to the resilient outer layer of the abrasive particle transfer roll.

3. Vibration assist where the abrasive particle transfer roll or production tooling is vibrated by a suitable source such as an ultrasonic device to shake the abrasive particles out of the cavities and onto the resin coated backing.

4. Pressure assist where each cavity in the production tooling has two open ends (FIG. 3) or the back surface 314 or the entire production tooling is suitably porous and the abrasive particle transfer roll has a plurality of apertures and an internal pressurized source of air. With pressure assist the production tooling no longer needs to be inverted but it still may be inverted. The abrasive particle transfer roll can also have movable internal dividers such that the pressurized air can be supplied to a specific arc segment or circumference of the roll to blow the abrasive particles out of the cavities and onto the resin coated backing at a specific location. In some embodiments, the abrasive particle transfer roll may also be provided with an internal source of vacuum without a corresponding pressurized region or in combination with the pressurized region typically prior to the pressurized region as the abrasive particle transfer roll rotates. The vacuum source or region can have movable dividers to direct it to a specific region or arc segment of the abrasive particle transfer roll. The vacuum can suck the abrasive particles firmly into the cavities as the production tooling wraps the abrasive particle transfer roll before subjecting the abrasive particles to the pressurized region of the abrasive particle transfer roll. This vacuum region be used, for example, with an abrasive particle removal member to remove excess abrasive particles from the dispensing surface or may be used to simply ensure the abrasive particles do not leave the cavities before reaching a specific position along the outer circumference of the abrasive particles transfer roll.

5. The various above listed embodiments are not limited to individual usage and they can be mixed and matched as necessary to more efficiently transfer the abrasive particles from the cavities to the resin coated backing.

The abrasive particle transfer roll 122 precisely transfers and positions each abrasive particle onto the resin coated backing substantially reproducing the pattern of abrasive particles and their specific orientation as arranged in the production tooling. Thus, for the first time, a coated abrasive article can be produced at speeds of, for example, 5-15 ft/min (1.5-4.6 m/min), or more where the exact position and/or radial orientation of each abrasive particle put onto the resin coated backing can be precisely controlled! As shown in the Examples later, the grinding performance for the same abrasive particle weight in the abrasive layer for a coated abrasive article can be significantly increased over the prior art electrostatic deposition method.

After separating from the abrasive particle transfer roll 122, the production tooling travels along the first web path 99 back towards the abrasive particle filling and excess removal section of the apparatus generally illustrated at 140 with the assistance of idler rolls 116 as necessary. An optional production tool cleaner 128 can be provided to remove stuck abrasive particles still residing in the cavities and/or to remove make coat resin 108 transferred to the dispensing surface 212. Choice of the production tool cleaner will depend on the configuration of the production tooling and could be either alone or in combination, an additional air blast, solvent or water spray, solvent or water bath, an ultrasonic horn, or an idler roll the production tooling wraps to use push assist to force the abrasive particles out of the cavities. Thereafter the endless production tooling 220 or belt advances to the abrasive particle filling and excess removal section 140 to be filled with new abrasive particles.

Various idler rolls 116 can be used to guide the abrasive particle coated backing 123 having a predetermined, reproducible, non-random pattern of abrasive particles on the first major surface that were applied by the abrasive particle transfer roll and held onto the first major surface by the make coat resin along the second web path 132 into an oven 124 for curing the make coat resin. Optionally, a second abrasive particle coater 126 can be provided to place additional abrasive particles, such as another type of abrasive particle or diluents, onto the make coat resin prior to the oven 124. The second abrasive particle coater 126 can be a drop coater, spray coater, or an electrostatic coater as known to those of skill in the art. Thereafter the cured backing 128 with abrasive particles can enter into an optional festoon 130 along the second web path prior to further processing such as the addition of a size coat, curing of the size coat, and other processing steps known to those of skill in the art of making coated abrasive articles.

Figure 1B:
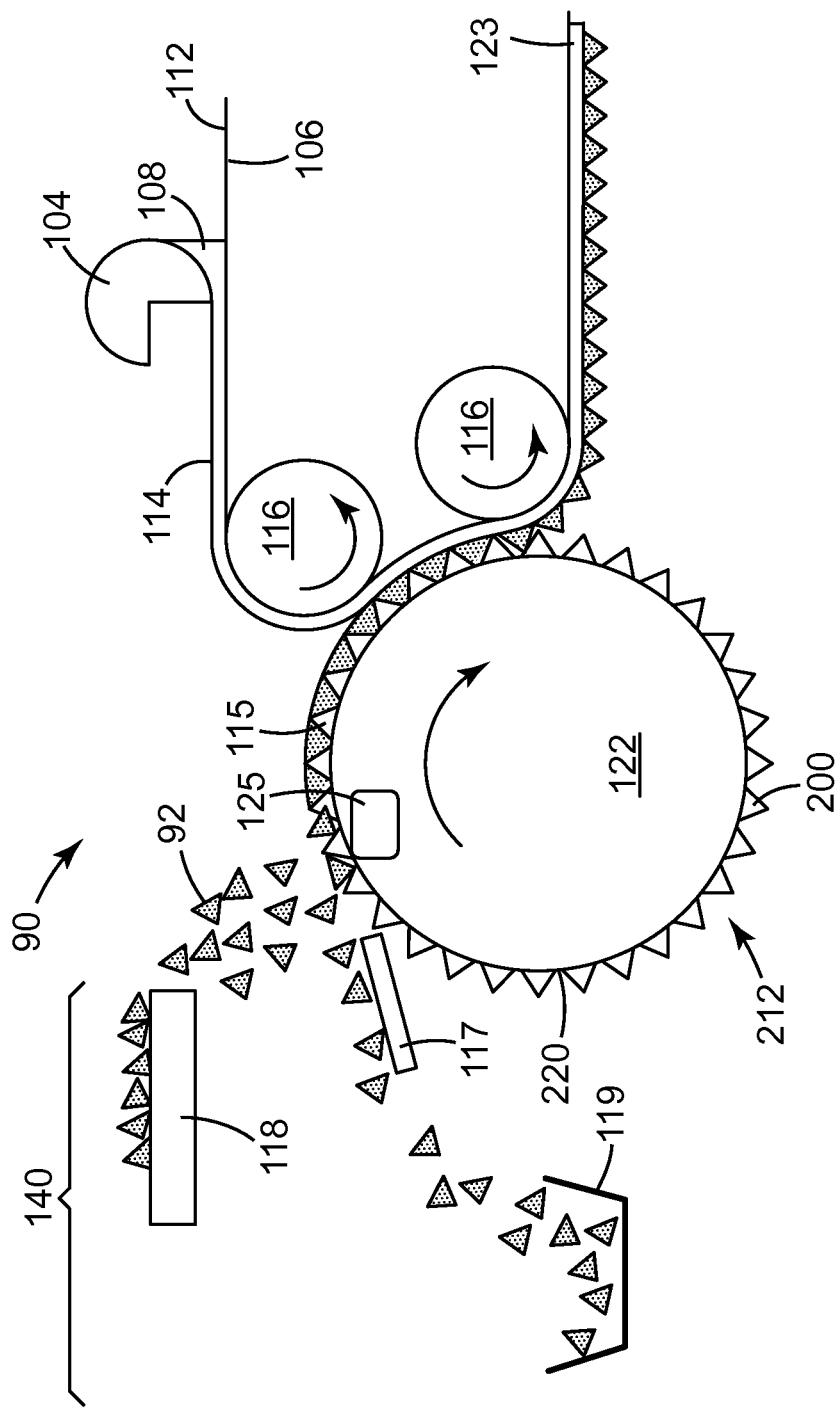
FIG. 1B is schematic view of another apparatus for making a coated abrasive article according to the present disclosure.

Referring now to FIG. 1B and FIG. 2 another apparatus 90 according to the present disclosure includes abrasive particles 92 removable disposed within shaped cavities 220 of a production tool 200. In this embodiment, the production tool can be a sleeve that fits over the abrasive particle transfer roll 122 or the cavities 220 can be machined directly into the outer circumference of the abrasive particle transfer roll 122. In FIG. 1B, the unwind and make coat delivery system are not illustrated. A coater 104 applies the make coat resin 108 to the first major surface 112 of the backing 106 forming the resin coated backing 114. Thereafter the resin coated backing 114 is guided by a pair of idler rolls 116 to wrap a portion of the abrasive particle transfer roll's outer circumference past top dead center (TDC) 115 of the abrasive particle transfer roll 122. As previously described, abrasive particles 92 are applied by the abrasive particle feeder 118 to the abrasive particle transfer roll 122 prior to TDC and preferably an excess amount of abrasive particles are applied. In some embodiments, the resin coated backing 114 wraps between 20 to 180 degrees, or between 20 to 90 degrees of the outer circumference of the abrasive particle transfer roll 122.

An optional abrasive particle retaining member 117 such as a plate or chute can be placed adjacent the dispensing surface 212 of the production tooling prior to TDC to retard the freefall of the abrasive particles supplied to the dispensing surface by the abrasive particle feeder 118. The slope or incline of the abrasive particle retaining member can be adjusted to maintain a supply of abrasive particles on or near the dispensing surface for deposition into the cavities while excess abrasive particles slide down the inclined surface and into a catch pan 119. As with the first embodiment, an optional filling assist member 120 and an optional abrasive particle removal member 121 can also be used in this embodiment. An optional vacuum box 125 can be used internally within the abrasive particle transfer roll to pull the abrasive particles into the cavities. Once the abrasive particles are transferred to the resin coated backing 114 and the abrasive particle coated backing 123 is guided away from the abrasive particle transfer roll 122 further processing such as described above for the first embodiment can be performed.

Method of Making a Coated Abrasive Article

A coated abrasive article maker apparatus is generally illustrated at FIG. 1A. The method generally involves the steps of filling the cavities in a production tool each with an individual abrasive particle. Aligning a filled production tool and a resin coated backing for transfer of the abrasive particles to the resin coated backing. Transferring the abrasive particles from the cavities onto the resin coated backing and removing the production tool from the aligned position with the resin coated backing. Thereafter the resin layer is cured, a size coat is applied and cured and the coated abrasive article is converted to sheet, disk, or belt form by suitable converting equipment.

In other embodiments, a batch process can be used where a length of the production tooling can be filled with abrasive particles, aligned or positioned with a length of resin coated backing such that the resin layer of the backing faces the dispensing surface of the production tooling and thereafter the abrasive particles transferred from the cavities to the resign layer. The batch process can be practiced by hand or automated using robotic equipment.

In a specific embodiment, a method of making a patterned abrasive layer on a resin coated backing including the flowing steps. It is not required to perform all steps or perform them in a sequential order, but they can be performed in the order listed or additional steps performed in between.

A step can be providing a production tool (FIG. 11B) having a dispensing surface 1112 with cavities 320, each cavity having a longitudinal cavity axis 247 perpendicular to the dispensing surface and a depth D, 260, along the longitudinal cavity axis. Further information concerning useful production tools and cavities is disclosed in the section entitled Production Tools and Abrasive Particle Positioning Systems.

Another step can be selecting elongated abrasive particles having a length L, 270, along a longitudinal particle axis greater than a width W along a transverse axis perpendicular to the longitudinal particle axis. The elongated abrasive particles may be any of the referenced abrasive particle disclosed herein. The longitudinal particle axis is the axis aligned with and parallel to the maximum dimension of the abrasive particle. For a rod shaped abrasive particle it would be centrally located down the length of the cylindrical abrasive particle. For equilateral triangular abrasive particles, the longitudinal particle axis intersects one vertex of the triangle and the opposing base at a right angle and is equally disposed between the opposing faces of the equilateral triangle.

Figure 11A:
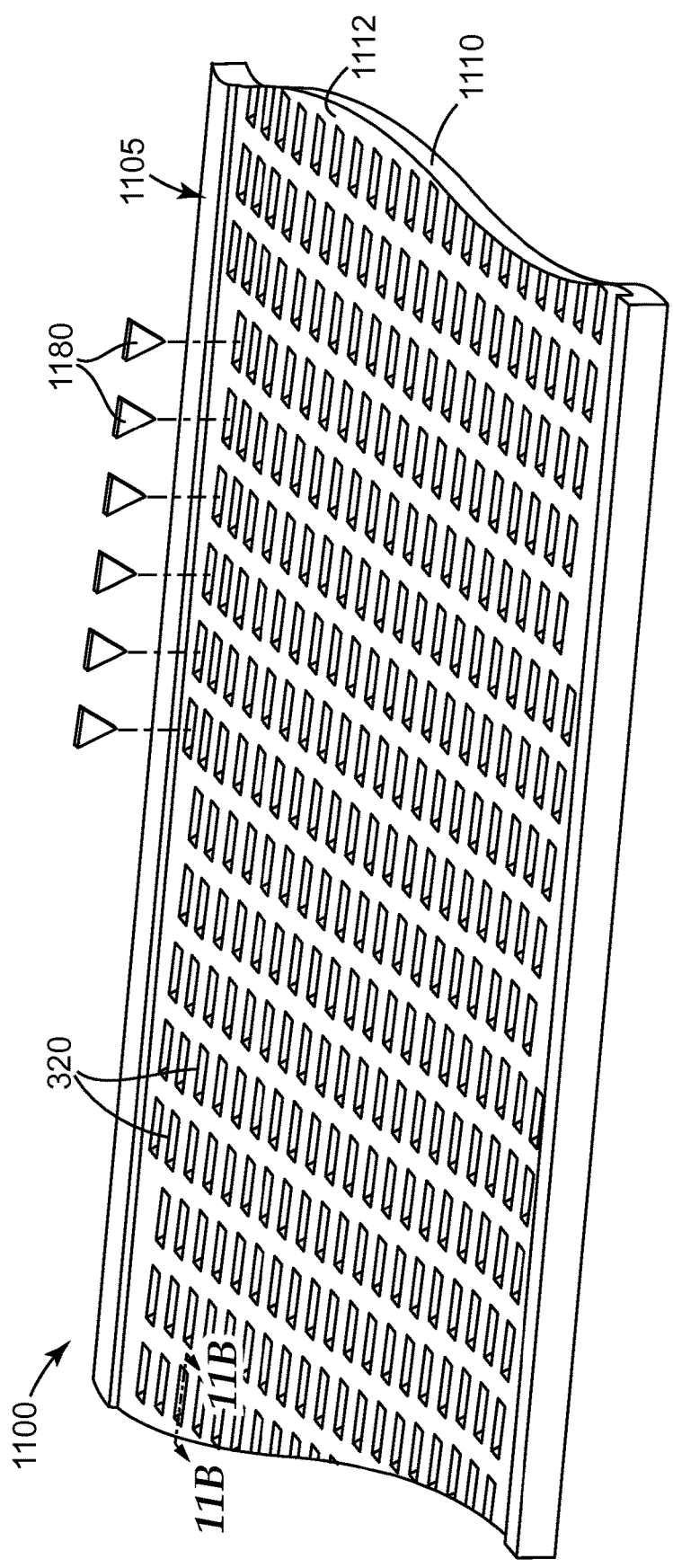
FIG. 11A is a schematic partially-exploded perspective view of an exemplary perspective view of an abrasive particle positioning system 1100 according to one exemplary embodiment of the present disclosure.
Figure 11B:
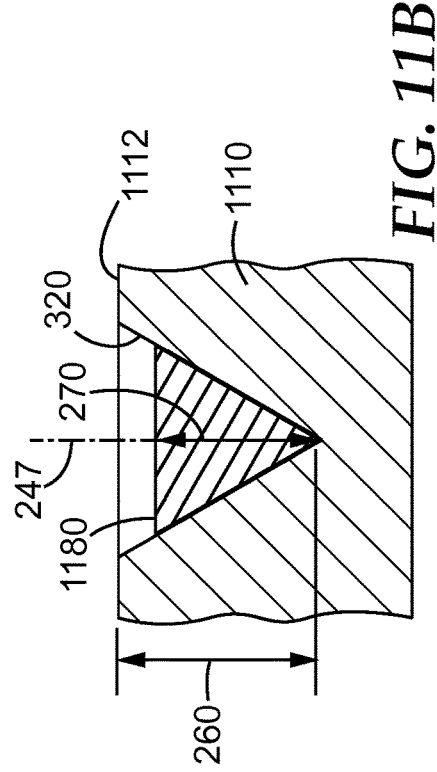
FIG. 11B is a schematic cross-sectional side view of abrasive particle positioning system 1100 taken along plane 11B-11B.

In selected embodiments, the depth D, 260, of the cavities is between 0.5 times L (0.5L) to 2 times L (2L), or between 1.1 times L (1.1L) to 1.5 times L (1.5) so that the elongated abrasive particles disposed in the cavities reside in the production tooling beneath the dispensing surface as shown in FIG. 11B. In another embodiment, the center of mass for the abrasive particle resides within the cavity of the production tool when the abrasive particle is fully inserted into the cavity. If the depth of the cavities becomes too short, with the abrasive particle's center of mass being located outside of the cavity, the abrasive particles are not readily retained within the cavities and can jump back out as the production tool is translated through the apparatus. In a preferred embodiment, disposing the elongated abrasive particle beneath the surface allows for sliding excess abrasive particles around on the dispensing surface to either move them into a cavity or to remove them from the dispensing surface.

Another step can be supplying an excess of the elongated abrasive particles to the dispensing surface such that more elongated abrasive particles are provided than the number of cavities. An excess of elongated abrasive particles, meaning there are more elongated abrasive particles present per unit length of the production tool than cavities present, helps to ensure all cavities within the production tool are eventually filled with an abrasive particle as the elongated abrasive particles pile onto the dispensing surface and are moved about either due to gravity or other mechanically applied forces to translate them into a cavity. Since the bearing area and spacing of the abrasive particles is often designed into the production tooling for the specific grinding application, it is desirable to not have too many unfilled cavities.

Another step can be filling a majority of the cavities in the dispensing surface with an elongated abrasive particle disposed in an individual cavity such that the longitudinal particle axis of the elongated abrasive particle is parallel to the longitudinal cavity axis. It is desirable to transfer the elongated abrasive particles onto the resin coated backing such that they stand up or are erectly applied. Therefore the cavity shape is designed to hold the elongated abrasive particle erectly. In various embodiments, at least 60, 70, 80, 90, or 95 percent of the cavities in the dispensing surface contain an elongated abrasive particle. In some embodiments, gravity can be used to fill the cavities. In other embodiments, the production tool can be inverted and vacuum applied to hold the abrasive particles or elongated abrasive particles in the cavities. The abrasive particles could be applied by spray, fluidized bed (air or vibration) or electrostatic coating. Removal of excess abrasive particles would be done by gravity as any abrasive particles not retained would fall back down. The abrasive particles can thereafter be transferred to the resin coated backing by removing vacuum.

Another step can be removing a remaining fraction of the excess elongated abrasive particles not disposed within a cavity after the filling step from the dispensing surface. As mentioned, more elongated abrasive particles are supplied than cavities such that some will remain on the dispensing surface after each cavity has been filled. These excess elongated abrasive particles can often be blown, wiped, or otherwise removed from the dispensing surface. For example, a vacuum or other force could be applied to hold the elongated abrasive particles in the cavities and the dispensing surface inverted to clear it of the remaining fraction of the excess elongated abrasive particles.

Another step can be aligning the resin coated backing with the dispensing surface with the resin layer facing the dispensing surface. Various methods can be used to align the surfaces as shown in FIGS. 1A and 1B or positioning the resin coated backing and the production tooling by hand or robots using discrete lengths of each.

Another step can be transferring the elongated abrasive particles in the cavities to the resin coated backing and attaching the elongated abrasive particles to the resin layer. Transferring can use gravity assist wherein the dispensing surface is positioned to allow the force of gravity to slide the elongated abrasive particles into the cavities during the filling step and the dispensing surface is inverted during the transferring step to allow the force of gravity to slide the elongated abrasive particles out of the cavities may be used. Transferring can use push assist where a contact member such as the outer circumference of the abrasive particle transfer roll, the optional compressible resilient layer attached to the back surface of the carrier layer of the production tool, or another device such as doctor blade or wiper can move the elongated abrasive particles laterally along the longitudinal cavity axis for contact with the resin layer. Transferring can use pressure assist where air blows into the cavities; especially cavities having an open opposing end from the opening in the dispensing surface to move the elongated abrasive particles laterally along the longitudinal cavity axis. Transferring can use vibration assist by vibrating the production tool to shake the elongated abrasive particles out of the cavities. These various methods may be used alone or in any combination.

Another step can be removing the production tool to expose the patterned abrasive layer on the resin coated backing. Various removing or separating methods can be used as shown in FIGS. 1A and 1B or the production tool can be lifted by hand to separate it from the resin coated backing. The patterned abrasive layer is an array of the elongated abrasive particles having a substantially repeatable pattern as opposed to a random distribution created by electrostatic coating or drop coating.

In any of the above embodiments, a filling assist member as previously described can move the elongated abrasive particles around on the dispensing surface after the supplying step to direct the elongated abrasive particles into the cavities. In any of the previous embodiments, the cavities can taper inward when moving along the longitudinal cavity axis from the dispensing surface. In any of the previous embodiments, the cavities can have a cavity outer perimeter surrounding the longitudinal cavity axis and the elongated abrasive particles have an abrasive particle outer perimeter surrounding the longitudinal particle axis and the shape of the cavity outer perimeter matches the shape of the elongated abrasive particle outer perimeter. In any of the previous embodiments, the elongated abrasive particles can be equilateral triangles and the width of the elongated abrasive particles along the longitudinal particle axis is nominally the same. A nominal width of elongated abrasive particles means that the width dimension varies less than ±30 percent.

Production Tools and Abrasive Particle Positioning Systems

Abrasive particle positioning systems according to the present disclosure include abrasive particles removably disposed within shaped cavities of a production tool.

Referring now to FIG. 2, exemplary production tool 200 comprises carrier member 210 having dispensing and back surfaces 212, 214. Dispensing surface 212 comprises cavities 220 that extend into carrier member 210 from cavity openings 230 at the dispensing surface 212. Optional compressible resilient layer 240 is secured to back surface 214. Cavities 220 are disposed in an array 250, which is disposed with a primary axis 252 at offset angle α relative to longitudinal axis 202 (corresponding to the machine direction in the case or a belt or roll) of production tool 200.

Typically, the openings of the cavities at the dispensing surface of the carrier member are rectangular; however, this is not a requirement. The length, width, and depth of the cavities in the carrier member will generally be determined at least in part by the shape and size of the abrasive particles with which they are to be used. For example, if the abrasive particles are shaped as equilateral trigonal plates, then the lengths of individual cavities should preferably be from 1.1-1.2 times the maximum length of a side of the abrasive particles, the widths of individual cavities are preferably from 1.1-2.5 times the thickness of the abrasive particles, and the respective depths of the cavities should are preferably 1.0 to 1.2 times the width of the abrasive particles if the abrasive particles are to be contained within the cavities.

Alternatively, for example, if the abrasive particles are shaped as equilateral trigonal plates, then the lengths of individual cavities should be less than that of an edge of the abrasive particles, and/or the respective depths of the cavities should be less than that of the width of the abrasive particles if the abrasive particles are to protrude from the cavities. Similarly, the width of the cavities should be selected such that a single abrasive particle fits within each one of the cavities.

Similarly, the width of the cavities should be selected such that a single abrasive particle fits within each one of the cavities.

Optional longitudinally-oriented standoff members 260 are disposed along opposite edges (e.g., using adhesive or other means) of dispensing surface 212. Variations in design of the standoff members height allow adjustment of distance between the cavity openings 230 and a substrate (e.g., a backing having a make coat precursor thereon) that is brought into contact with the production tool.

If present, the longitudinally-oriented standoff members 260 may have any height, width and/or spacing (preferably they have a height of from about 0.1 mm to about 1 mm, a width of from about 1 mm to about 50 mm, and a spacing of from about 7 to about 24 mm). Individual longitudinally-oriented standoff members may be, for example, continuous (e.g., a rib) or discontinuous (e.g., a segmented rib, or a series of posts). In the case, that the production tool comprises a web or belt, the longitudinally-oriented standoff members are typically parallel to the machine direction.

The function of offset angle α is to arrange the abrasive particles on the ultimate coated abrasive article in a pattern that will not cause grooves in a workpiece. The offset angle α may have any value from 0 to about 30 degrees, but preferably is in a range of from 1 to 5 degrees, more preferably from 1 to 3 degrees.

Suitable carrier members may be rigid or flexible, but preferably are sufficiently flexible to permit use of normal web handling devices such as rollers. Preferably, the carrier member comprises metal and/or organic polymer. Such organic polymers are preferably moldable, have low cost, and are reasonably durable when used in the abrasive particle deposition process of the present disclosure. Examples of organic polymers, which may be thermosetting and/or thermoplastic, that may be suitable for fabricating the carrier member include: polypropylene, polyethylene, vulcanized rubber, polycarbonates, polyamides, acrylonitrile-butadiene-styrene plastic (ABS), polyethylene terephthalate (PET), polybutylene terephthalate (PET), polyimides, polyetheretherketone (PEEK), polyetherketone (PEK), and polyoxymethylene plastic (POM, acetal), poly(ether sulfone), poly(methyl methacrylate), polyurethanes, polyvinyl chloride, and combinations thereof.

The production tool can be in the form of, for example, an endless belt (e.g., endless belt 200 shown in FIG. 1A), a sheet, a continuous sheet or web, a coating roll, a sleeve mounted on a coating roll, or die. If the production tool is in the form of a belt, sheet, web, or sleeve, it will have a contacting surface and a non-contacting surface. If the production tool is in the form of a roll, it will have a contacting surface only. The topography of the abrasive article formed by the method will have the inverse of the pattern of the contacting surface of the production tool. The pattern of the contacting surface of the production tool will generally be characterized by a plurality of cavities or recesses. The opening of these cavities can have any shape, regular or irregular, such as, for example, a rectangle, semi-circle, circle, triangle, square, hexagon, or octagon. The walls of the cavities can be vertical or tapered. The pattern formed by the cavities can be arranged according to a specified plan or can be random. Desirably, the cavities can butt up against one another.

The carrier member can be made, for example, according to the following procedure. A master tool is first provided. The master tool is typically made from metal, e.g., nickel. The master tool can be fabricated by any conventional technique, such as, for example, engraving, hobbing, knurling, electroforming, diamond turning, or laser machining. If a pattern is desired on the surface of the production tool, the master tool should have the inverse of the pattern for the production tool on the surface thereof. The thermoplastic material can be embossed with the master tool to form the pattern. Embossing can be conducted while the thermoplastic material is in a flowable state. After being embossed, the thermoplastic material can be cooled to bring about solidification.

The carrier member may also be formed by embossing a pattern into an already formed polymer film softened by heating. In this case, the film thickness may be less than the cavity depth. This is advantageous in improving the flexibility of carriers having deep cavities.

The carrier member can also be made of a cured thermosetting resin. A production tool made of thermosetting material can be made according to the following procedure. An uncured thermosetting resin is applied to a master tool of the type described previously. While the uncured resin is on the surface of the master tool, it can be cured or polymerized by heating such that it will set to have the inverse shape of the pattern of the surface of the master tool. Then, the cured thermosetting resin is removed from the surface of the master tool. The production tool can be made of a cured radiation curable resin, such as, for example acrylated urethane oligomers. Radiation cured production tools are made in the same manner as production tools made of thermosetting resin, with the exception that curing is conducted by means of exposure to radiation (e.g., ultraviolet radiation).

The carrier member may have any thickness as long as it has sufficient depth to accommodate the abrasive particles and sufficient flexibility and durability for use in manufacturing processes. If the carrier member comprises an endless belt, then carrier member thicknesses of from about 0.5 to about 10 millimeters are typically useful; however, this is not a requirement.

The cavities may have any shape, and are typically selected depending on the specific application. Preferably, at least a portion (and more preferably a majority, or even all) of the cavities are shaped (i.e., individually intentionally engineered to have a specific shape and size), and more preferably are precisely-shaped. In some embodiments, the cavities have smooth walls and sharp angles formed by a molding process and having an inverse surface topography to that of a master tool (e.g., a diamond turned metal master tool roll) in contact with which it was formed. The cavities may be closed (i.e., having a closed bottom).

Preferably, at least some of the sidewalls taper inwardly from their respective cavity opening at the dispensing surface of the carrier member with increasing cavity depth, or the cavity opening at the back surface. More preferably, all of the sidewalls taper inwardly from the opening at the dispensing surface of the carrier member with increasing cavity depth (i.e., with increasing distance from the dispensing surface).

In some embodiments, at least some of the cavities comprise first, second, third, and fourth sidewalls. In such embodiments, the first, second, third, and fourth side walls may be consecutive and contiguous.

In embodiments in which the cavities have no bottom surface but do not extend through the carrier member to the back surface, the first and third walls may intersect at a line, while the second and fourth sidewalls do not contact each other.

One embodiment of a cavity of this type is shown in FIGS. 3A-3C. Referring now to FIGS. 3A-3C, exemplary cavity 320 in carrier member 310 has length 301 and width 302 (see FIG. 3A), and depth 303 (see FIG. 3B). Cavity 320 comprises four sidewalls 311a, 311b, 313a, 313b. Sidewalls 311a, 311b extend from openings 330 at dispensing surface 312 of carrier member 310 and taper inward at a taper angle β with increasing depth until they meet at line 318 (see FIG. 3B). Likewise, sidewalls 313a, 313b taper inwardly at a taper angle γ with increasing depth until they contact line 318 (see FIGS. 3A and 3C).

Taper angles β and γ will typically depend on the specific abrasive particles selected for use with the production tool, preferably corresponding to the shape of the abrasive particles. In this embodiment, taper angle β may have any angle greater than 0 and less than 90 degrees. In some embodiments, taper angle β has a value in the range of 40 to 80 degrees, preferably 50 to 70 degrees, and more preferably 55 to 65 degrees. Taper angle γ will likewise typically depend on the generally be selected. In this embodiment, taper angle γ may have any angle in the range of from 0 and to 30 degrees. In some embodiments, taper angle γ has a value in the range of 5 to 20 degrees, preferably 5 to 15 degrees, and more preferably 8 to 12 degrees.

In some embodiments, the cavities are open at both the dispensing and the back surfaces. In some of these embodiments, the first and third sidewalls do not contact each other and the second and fourth sidewalls do not contact each other.

Figure 4A:
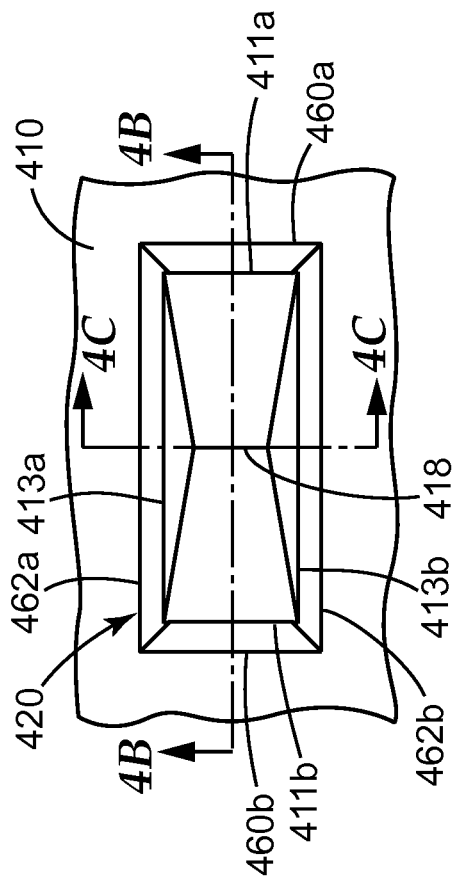
FIG. 4A is an enlarged schematic top view of an exemplary cavity 420 design suitable for use as cavities 220 in production tool 200.
Figure 4C:
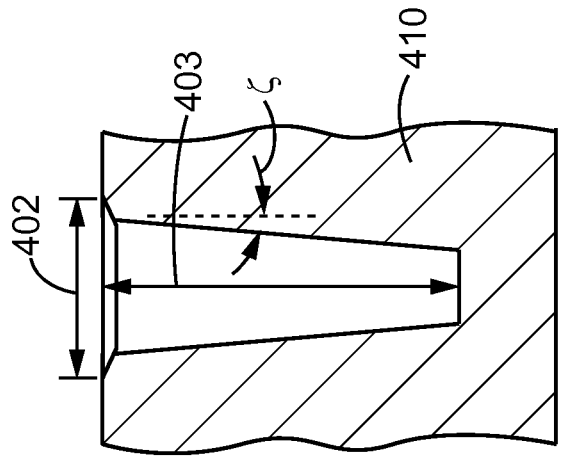
FIG. 4C is a schematic cross-sectional view of FIG. 4A taken along plane 4C-4C.
Figure 4B:
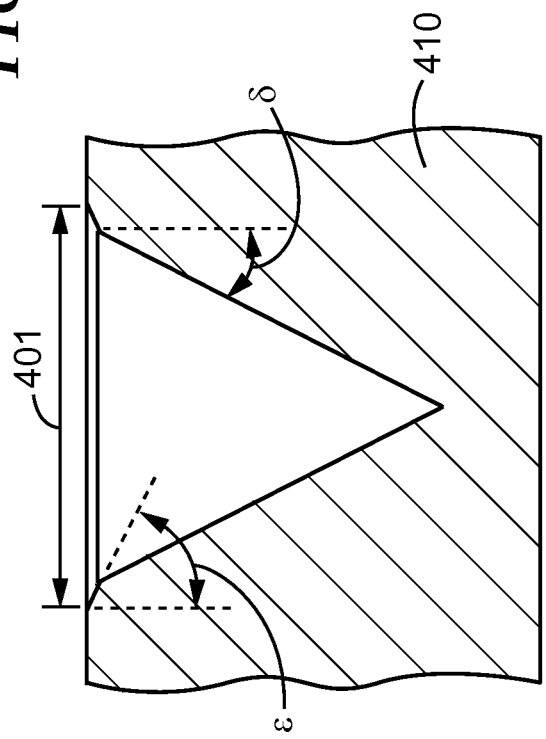
FIG. 4B is a schematic cross-sectional view of FIG. 4A taken along plane 4B-4B.

FIGS. 4A-4B show an alternative cavity 420 of similar type. Referring now to FIGS. 4A-4C, exemplary cavity 420 in carrier member 410 has length 401 and width 402 (see FIG. 4A), and depth 403 (see FIG. 4B). Cavity 420 comprises four chamfers (460a, 460b, 462a, 462b) that contact dispensing surface 412 of carrier member 410 and four respective sidewalls 411a, 411b, 413a, 413b. Chamfers 460a, 460b, 462a, 462b each taper inward at a taper angle of δ (see FIG. 4B) and help guide abrasive particles into cavity 420. Sidewalls 411a, 411b extend from chamfers (460a, 460b) and taper inward at a taper angle ε with increasing depth until they meet at line 418 (see FIG. 4B). Sidewalls 413a, 413b likewise taper inwardly at a taper angle ζ with increasing depth until they contact line 418 (see FIGS. 4B and 4C).

Taper angle δ will typically depend on the specific abrasive particles selected for use with the production tool, preferably corresponding to the shape of the abrasive particles. In this embodiment, taper angle δ may have any angle greater than 0 and less than 90 degrees. Preferably, taper angle δ has a value in the range of 20 to 80 degrees, preferably 30 to 60 degrees, and more preferably 35 to 55 degrees Taper angle ε will typically depend on the specific abrasive particles selected for use with the production tool. In this embodiment, taper angle ε may have any angle greater than 0 and less than 90 degrees. In some embodiments, taper angle ε has a value in the range of 40 to 80 degrees, preferably 50 to 70 degrees, and more preferably 55 to 65 degrees.

Taper angle ζ will likewise typically depend on the specific abrasive particles selected for use with the production tool. In this embodiment, taper angle ζ may have any angle in the range of from 0 and to 30 degrees. In some embodiments, taper angle ζ has a value in the range of 5 to 25 degrees, preferably 5 to 20 degrees, and more preferably 10 to 20 degrees.

The cavities may have a second opening at the back surface. In such cases, the second opening is preferably smaller than the first opening such that the abrasive particles do not pass completely through both openings (i.e., the second opening is small enough to prevent passage of the abrasive particles through the carrier member).

One exemplary embodiment of a cavity of this type is shown in FIGS. 5A-5C. Referring now to FIGS. 5A-5C, exemplary cavity 520 in carrier member 510 has length 501 and width 502 (see FIG. 5A), and depth 503 (see FIG. 5B). Cavity 520 comprises four sidewalls 511*a*, 511*b*, 513*a*, 513*b*. Sidewalls 511*a*, 511*b* extend from first opening 530 at dispensing surface 512 of carrier member 510 and taper inward at a taper angle η with increasing depth until they contact conduit 565 which extends to second opening 570 at back surface 514 of carrier member 510 (see FIG. 5B). Likewise, sidewalls 513*a*, 513*b* taper inwardly at a taper angle θ with increasing depth until they contact second opening 570 (see FIG. 5C). Conduit 565 is shown as having constant cross-section; however, this is not a requirement.

Taper angles η and θ will typically depend on the specific abrasive particles selected for use with the production tool, preferably corresponding to the shape of the abrasive particles. In this embodiment, taper angle η may have any angle greater than 0 and less than 90 degrees. In some embodiments, taper angle η has a value in the range of 40 to 80 degrees, preferably 50 to 70 degrees, and more preferably 55 to 65 degrees.

Taper angle θ will likewise typically depend on the generally be selected. In this embodiment, taper angle θ may have any angle in the range of from 0 and to 30 degrees. In some embodiments, taper angle γ has a value in the range of 5 to 25 degrees, preferably 5 to 20 degrees, and more preferably 10 to 20 degrees.

Another embodiment of a cavity having openings at the dispensing and back surfaces of the carrier member is shown in FIGS. 6A-6C. Referring now to FIGS. 6A-6C, carrier member 610 includes cavities 620 in carrier member 610 aligned with compressible conduits 621 in resilient compressible layer 640. Compressible conduits 621 extend from second opening 670 at back surface 614 of carrier member 610 through resilient compressible layer 640. While a compressible conduit is shown, it will be recognized that closed compressible cavity configurations may also be used.

The cavities are positioned according to at least one of: a predetermined pattern such as, for example, an aligned pattern (e.g., an array), a circular pattern, an irregular but partially aligned pattern, or a pseudo-random pattern.

Preferably, the lengths and/or widths of the cavities narrow with increasing cavity depth, being largest at the cavity openings at the dispensing surface. The cavity dimensions and/or shapes are preferably chosen for use with a specific shape and/or size of abrasive particle. The cavities may comprise a combination of different shapes and/or sizes, for example. The cavity dimensions should be sufficient to accommodate and orient the individual abrasive particles at least partially within the cavities. In some embodiments, a majority or all of the abrasive particles are retained in the cavities such that less than about 20 percent (more preferably less than 10 percent, or even less than 5 percent) of their length extends past the openings of the cavities in which they reside. In some embodiments, a majority or all of the abrasive particles fully reside within (i.e., are completely retained within) the cavities and do not extend past their respective cavity openings at the dispensing surface of the carrier member.

In some embodiments, the cavities may be cylindrical or conical. This may particularly desirable if using crushed abrasive grain or octahedral shaped particles such as diamonds.

The cavities comprise at least one sidewall and may comprise at least one bottom surface; however, preferably the entire cavity shape is defined by the sidewalls and any openings at the dispensing and back surfaces. In some preferred embodiments, the cavities have at least 3, at least 4, at least 5, at least 6, at least 7, at least 8 sidewalls The sidewalls are preferably smooth, although this is not a requirement. The sidewalls may be planar, curviplanar (e.g., concave or convex), conical, or frustoconical, for example.

In some embodiments, at least some of the cavities comprise first, second, third, and fourth sidewalls. In such embodiments, the first, second, third, and fourth side walls may be consecutive and contiguous.

In embodiments in which the cavities have no bottom surface but do not extend through the carrier member to the back surface, the first and third walls may intersect at a line, while the second and fourth sidewalls do not contact each other.

In some embodiments, the cavities are open at both the first and the back surfaces. In some of these embodiments, the first and third sidewalls do not contact each other and the second and fourth sidewalls do not contact each other.

Preferably, at least some of the sidewalls taper inwardly from their respective cavity opening at the dispensing surface of the carrier member with increasing cavity depth, or the cavity opening at the back surface. More preferably, all of the sidewalls taper inwardly from the opening at the dispensing surface of the carrier member with increasing cavity depth (i.e., with increasing distance from the dispensing surface).

In some embodiments, at least one, at least two, at least 3, or even at least 4 of the sidewalls are convex.

In some embodiments, at least some of the cavities may independently comprise one or more chamfers disposed between the dispensing surface and any or all of the sidewalls. The chamfers may facilitate disposition of the abrasive particles within the cavities.

To avoid build up of the make coat precursor resin on the dispensing surface of the carrier member, at least two longitudinally-oriented (i.e., oriented substantially parallel to the machine direction of the carrier member/production tool in use) raised standoff members are preferably affixed to or integrally formed with the carrier. Preferably, at least two of the standoff members are disposed adjacent to the side edges along the length of the production tool. Examples of suitable standoff members that can be integrally formed with the carrier member include posts and ribs (continuous or segmented). Longitudinal orientation of the standoff members may be achieved by orientation of individual elongated raised standoff members such as ribs or tapes, or by patterns of low aspect raised stand of members such as, for example, an isolated row or other pattern of posts or other raised features.

Figure 7:
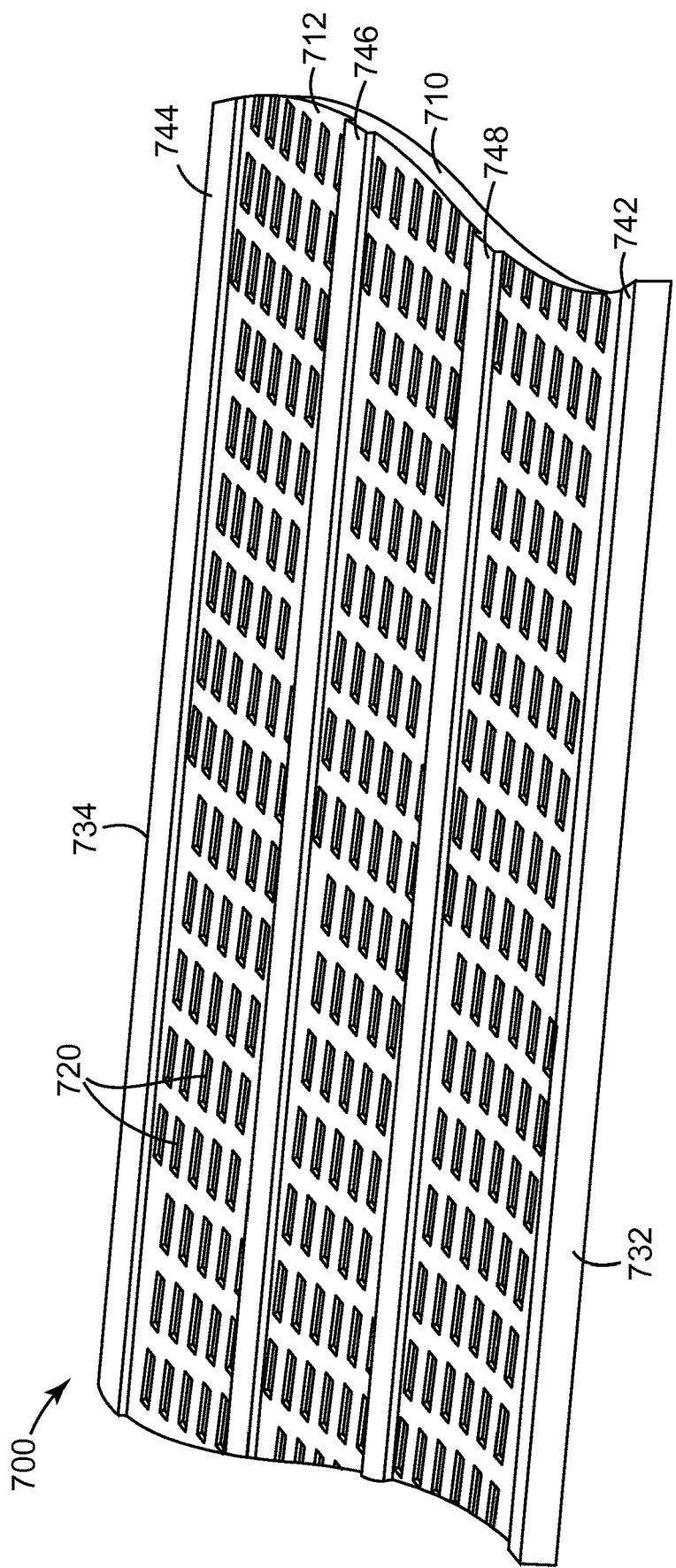
FIG. 7 is a schematic perspective view of an exemplary production tool 700 according to one exemplary embodiment of the present disclosure.

Referring now to FIG. 7, one exemplary production tool 700, an endless belt, comprises carrier member 710 with cavities 720. Longitudinally-oriented raised standoff members 742, 744 are composed of continuous ribs integrally formed along and adjacent to side edges 732, 734 of carrier member 700 thereby providing an offset between dispensing surface 712 of carrier member 710 and a make coat precursor coated backing during the transfer of abrasive particles. Optional longitudinally-oriented raised standoff members 746, 748 are composed of ribs integrally formed at intervals across the width of carrier member 710.

Figure 8:
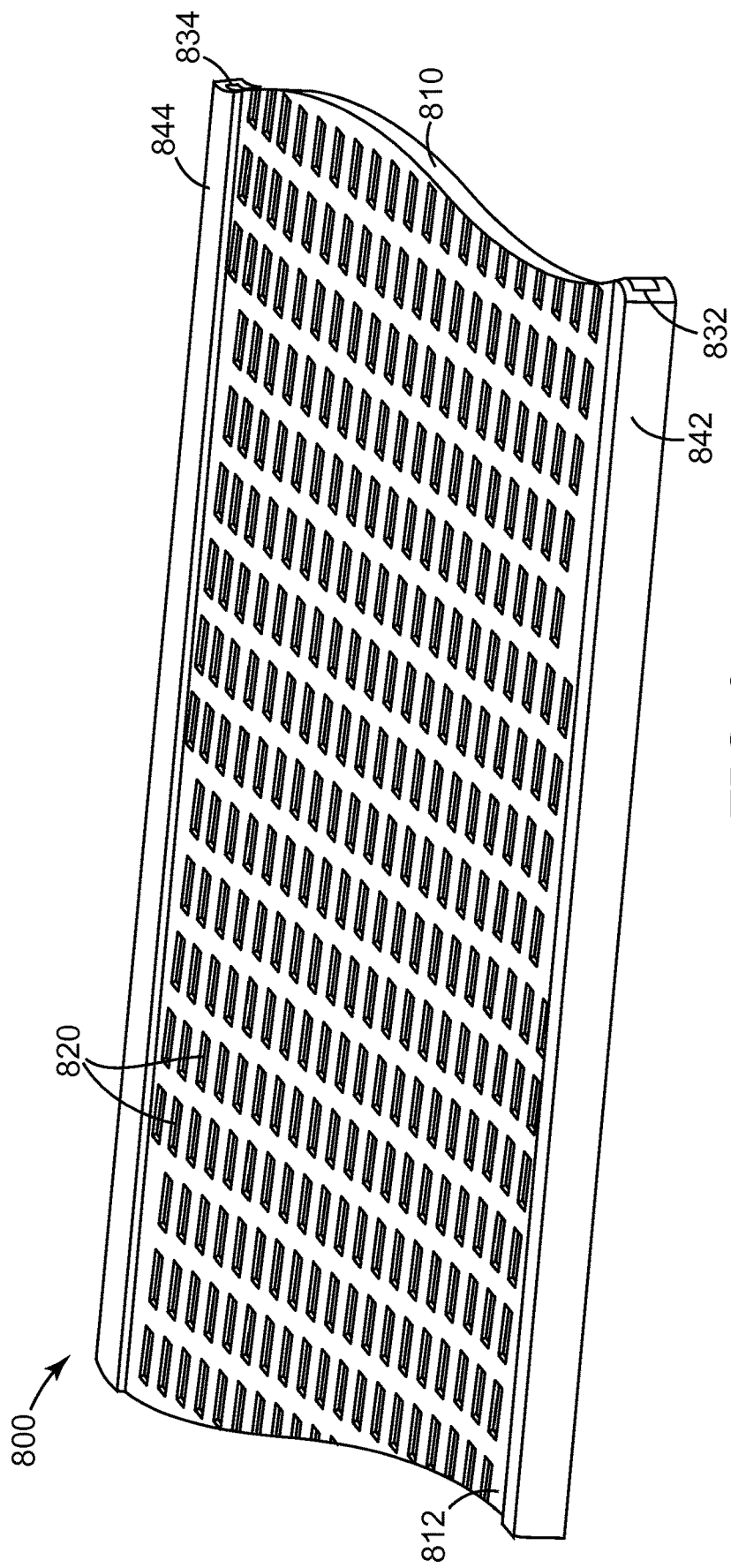
FIG. 8 is a schematic perspective view of an exemplary production tool 800 according to one exemplary embodiment of the present disclosure.

Alternatively, or in addition, the standoff members may be otherwise affixed to the carrier member; for example, using adhesive or a mechanical fastener. One example of a preferred standoff member comprises adhesive-backed tape. Tape may be applied to just the dispensing surface of the carrier member, or it may be folded over the side edges and adhered to the back surface of the carrier member, for example. Referring now to FIG. 8, one exemplary production tool 800, an endless belt, comprises carrier member 810 with cavities 820. Tapes 842, 844 are applied around side edges 832, 834 of carrier member 800 thereby providing an offset between the dispensing surface 812 of carrier member 810 and a make coat precursor coated backing during the transfer of abrasive particles.

Figure 9:
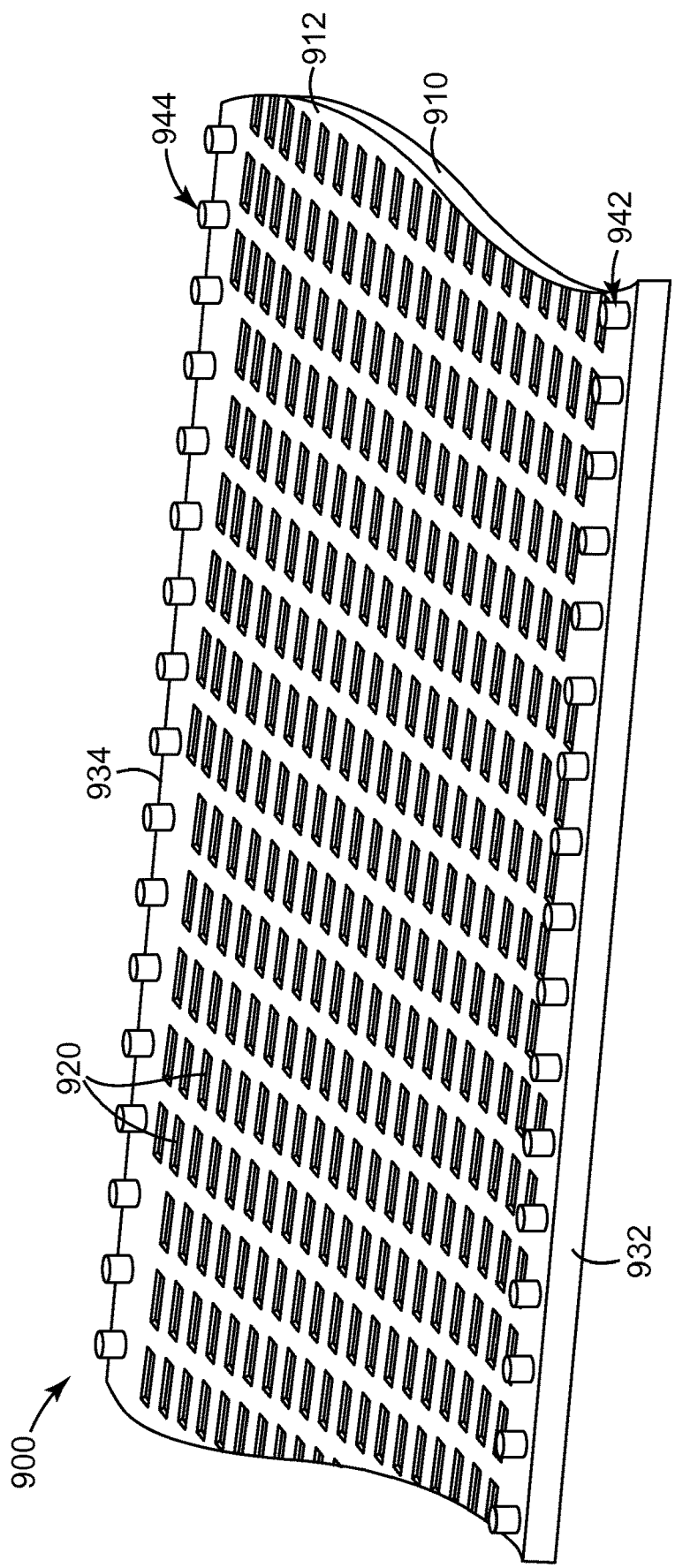
FIG. 9 is a schematic perspective view of an exemplary production tool 900 according to one exemplary embodiment of the present disclosure.

Alternatively, or in addition, multiple standoff members such as, for example, rows of raised posts collectively longitudinally-oriented by positioning at intervals along and adjacent to side edges of the carrier member. Referring now to FIG. 9, one exemplary production tool 900, an endless belt, comprises carrier member 910 with cavities 920. Rows of raised posts 942, 944 are integrally formed in carrier member 910 adjacent side edges 932, 934 of carrier member 910 thereby providing an offset between dispensing surface 912 of carrier member 910 and a make coat precursor coated backing during the transfer of abrasive particles.

Alternatively, or in addition, a gap may be maintained between the production tool and coated substrate so as to prevent any contact between the two surfaces.

Design and fabrication of carrier members, and of master tooling used in their manufacture, can be found in, for example, U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

To form an abrasive particle positioning system, abrasive particles are introduced into at least some cavities of a carrier member as described herein.

The abrasive particles can be disposed within the cavities of the carrier member using any suitable technique. Examples include dropping the abrasive particles onto the carrier member while it is oriented with the dispensing surface facing upward, and then agitating the particles sufficiently to cause them to fall into the cavities. Examples of suitable agitation methods may include, brushing, blowing, vibrating, applying a vacuum (for carrier members having cavities with openings at the back surface), and combinations thereof.

In typical use, abrasive particles are removably disposed within at least a portion, preferably at least 50, 60, 70, 80, 90 percent or even 100 percent of the cavities in the production tool. Preferably, abrasive particles are removably and completely disposed within at least some of the cavities, more preferably the abrasive particles are removably and completely disposed within at least 80 percent of the cavities. In some embodiments, the abrasive particles protrude from the cavities or reside completely within them, or a combination thereof.

For example, referring now to FIGS. 10A and 10B, abrasive particle positioning system 1000 comprises abrasive particles 1080 and production tool 1005. Abrasive particles 1080 are disposed partially within cavities 320 (shown in FIGS. 3A-3C) in dispensing surface 1012 of carrier member 1010 of production tool 1005. In this embodiment, abrasive particles 1080 protrude from respective cavities 320.

Referring now to FIGS. 11A and 11B, abrasive particle positioning system 1100 comprises abrasive particles 1180 and production tool 1105. Abrasive particles 1180 are fully disposed within cavities 320 (shown in FIGS. 3A-3C) in dispensing surface 1112 of carrier member 1110 of production tool 1105.

Referring now to FIGS. 12A and 12B, abrasive particle positioning system 1200 comprises abrasive particles 1280 and production tool 1205. Abrasive particles 1280 are partially disposed within cavities 620 (shown in FIGS. 6A-6C) in dispensing surface 12112 of carrier member 1210 of production tool 1205. In this embodiment, abrasive particles 1280 are partially disposed within respective cavities 620, with tips protruding into compressible conduits 621. Compression of the resilient compressible layer 640 (e.g., against a roller) urges the abrasive particles from the cavities.

As discussed above, a resilient compressible layer may be secured to the back surface of the carrier member, regardless of whether the cavities extend through to the back surface. This may facilitate web handling and/or abrasive particle removal from the cavities. For example, in embodiments wherein the resilient compressible layer comprises shaped recesses aligned in registration with the respective second opening of each one of at least a portion of the cavities abrasive particles in the cavities that extend into the shaped recesses may be mechanically urged out of the cavities by pressure applied against the resilient compressible layer. This may occur, for example, by compression at a nip roll where the abrasive particle positioning system contacts a make coat precursor on a backing during manufacture of coated abrasive articles. If present, the resilient compressible layer may have any thickness, with the specific choice of abrasive particles and equipment condition determining the selection of thickness, composition, and/or durometer. If the resilient compressible layer comprises an endless belt, then resilient compressible layer thicknesses of from about 1 to about 25 millimeters are typically useful, but this is not a requirement.

Exemplary materials suitable for the resilient compressible layers include elastic foams (e.g., polyurethane foams), rubbers, silicones, and combinations thereof.

The abrasive particles have sufficient hardness and surface roughness to function as abrasive particles in abrading processes.

Abrasive particles may be organic or inorganic particles. Examples of suitable inorganic abrasive particles include alumina or aluminum oxide, (such as fused aluminum oxide, heat treated fused aluminum oxide, ceramic aluminum oxide, heat treated aluminum oxide), silicon carbide, titanium diboride, alumina zirconia, diamond, boron carbide, ceria, aluminum silicates, cubic boron nitride, garnet, silica, and combinations thereof. Preferred fused aluminum oxides include those available commercially pretreated by Exolon ESK Company, Tonawanda, N.Y., or Washington Mills Electro Minerals Corp. Preferred ceramic aluminum oxide abrasive particles include those described in U.S. Pat. Nos. 4,314,827; 4,623,364; 4,744,802; 4,770,671; 4,881,951; 4,964,883; 5,011,508; and 5,164,348, the contents of all of which are incorporated herein by reference. Other examples of particles useful for this invention include solid glass spheres, hollow glass spheres, calcium carbonate, polymeric bubbles, silica and silicates, aluminum trihydrate, mullite, and pumice.

Organic abrasive particles suitable for use in abrasive article are preferably formed from a thermoplastic polymer and/or a thermosetting polymer. Organic abrasive particles can be formed from a thermoplastic material such as polycarbonate, polyetherimide, polyester, polyvinyl chloride (PVC), polymethacrylate, polymethylmethacrylate, polyethylene, polysulfone, polystyrene, acrylonitrile-butadiene-styrene block copolymer, polypropylene, acetal polymers, polyurethanes, polyamide, and combinations thereof. The organic abrasive particle may be a mixture of a thermoplastic polymer and a thermosetting polymer. Other suitable organic abrasive particles include natural products such as nut shells.

In some embodiments, the abrasive particles have a Mohs hardness of at least 4, at least 5, at least 6, at least 7, or even at least 8. Exemplary abrasive particles include crushed, shaped abrasive particles (e.g., shaped ceramic abrasive particles or shaped abrasive composite particles), and combinations thereof.

Examples of suitable abrasive particles include: fused aluminum oxide; heat-treated aluminum oxide; white fused aluminum oxide; ceramic aluminum oxide materials such as those commercially available under the trade designation 3M CERAMIC ABRASIVE GRAIN from 3M Company, St. Paul, Minn.; brown aluminum oxide; blue aluminum oxide; silicon carbide (including green silicon carbide); titanium diboride; boron carbide; tungsten carbide; garnet; titanium carbide; diamond; cubic boron nitride; garnet; fused alumina zirconia; iron oxide; chromia; zirconia; titania; tin oxide; quartz; feldspar; flint; emery; sol-gel-derived abrasive particles (e.g., including shaped and crushed forms); and combinations thereof. Further examples include shaped abrasive composites of abrasive particles in a binder matrix, such as those described in U.S. Pat. No. 5,152,917 (Pieper et al.). Many such abrasive particles, agglomerates, and composites are known in the art.

Examples of sol-gel-derived abrasive particles and methods for their preparation can be found in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the abrasive particles could comprise abrasive agglomerates such, for example, as those described in U.S. Pat. No. 4,652,275 (Bloecher et al.), U.S. Pat. No. 4,799,939 (Bloecher et al.), U.S. Pat. No. 6,521,004 (Culler et al.), or U.S. Pat. No. 6,881,483 (McArdle et al.). It is further contemplated that the abrasive particles could comprise precisely-shaped polymeric particles which comprise an organic binder and optional abrasive particles, such as those described in U.S. Pat. No. 5,714,259 (Holmes et al.) In some embodiments, the abrasive particles may be surface-treated with a coupling agent (e.g., an organosilane coupling agent) or other physical treatment (e.g., iron oxide or titanium oxide) to enhance adhesion of the abrasive particles to the binder. The abrasive particles may be treated before combining them with the binder, or they may be surface treated in situ by including a coupling agent to the binder Preferably, the abrasive particles comprise ceramic abrasive particles such as, for example, sol-gel-derived polycrystalline alpha alumina particles. The abrasive particles may be may be crushed or shaped, or a combination thereof.

Shaped ceramic abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. Publ. Pat. Appln. Nos. 2009/0165394 A1 (Culler et al.) and 2009/0169816 A1 (Erickson et al.).

Alpha alumina-based shaped ceramic abrasive particles can be made according to well-known multistep processes. Briefly, the method comprises the steps of making either a seeded or non-seeded sol-gel alpha alumina precursor dispersion that can be converted into alpha alumina; filling one or more mold cavities having the desired outer shape of the shaped abrasive particle with the sol-gel, drying the sol-gel to form precursor shaped ceramic abrasive particles; removing the precursor shaped ceramic abrasive particles from the mold cavities; calcining the precursor shaped ceramic abrasive particles to form calcined, precursor shaped ceramic abrasive particles, and then sintering the calcined, precursor shaped ceramic abrasive particles to form shaped ceramic abrasive particles. The process will now be described in greater detail.

Further details concerning methods of making sol-gel-derived abrasive particles can be found in, for example, U.S. Pat. No. 4,314,827 (Leitheiser); U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. Publ. Pat. Appln. No. 2009/0165394 A1 (Culler et al.).

Although there is no particularly limitation on the shape of the shaped ceramic abrasive particles, the abrasive particles are preferably formed into a predetermined shape by shaping precursor particles comprising a ceramic precursor material (e.g., a boehmite sol-gel) using a mold, followed by sintering. The shaped ceramic abrasive particles may be shaped as, for example, pillars, pyramids, truncated pyramids (e.g., truncated triangular pyramids), and/or some other regular or irregular polygons. The abrasive particles may include a single kind of abrasive particles or an abrasive aggregate formed by two or more kinds of abrasive or an abrasive mixture of two or more kind of abrasives. In some embodiments, the shaped ceramic abrasive particles are precisely-shaped in that individual shaped ceramic abrasive particles will have a shape that is essentially the shape of the portion of the cavity of a mold or production tool in which the particle precursor was dried, prior to optional calcining and sintering.

Shaped ceramic abrasive particles used in the present disclosure can typically be made using tools (i.e., molds) cut using precision machining, which provides higher feature definition than other fabrication alternatives such as, for example, stamping or punching. Typically, the cavities in the tool surface have planar faces that meet along sharp edges, and form the sides and top of a truncated pyramid. The resultant shaped ceramic abrasive particles have a respective nominal average shape that corresponds to the shape of cavities (e.g., truncated pyramid) in the tool surface; however, variations (e.g., random variations) from the nominal average shape may occur during manufacture, and shaped ceramic abrasive particles exhibiting such variations are included within the definition of shaped ceramic abrasive particles as used herein.

In some embodiments, the base and the top of the shaped ceramic abrasive particles are substantially parallel, resulting in prismatic or truncated pyramidal shapes, although this is not a requirement. In some embodiments, the sides of a truncated trigonal pyramid have equal dimensions and form dihedral angles with the base of about 82 degrees. However, it will be recognized that other dihedral angles (including 90 degrees) may also be used. For example, the dihedral angle between the base and each of the sides may independently range from 45 to 90 degrees, typically 70 to 90 degrees, more typically 75 to 85 degrees.

As used herein in referring to shaped ceramic abrasive particles, the term "length" refers to the maximum dimension of a shaped abrasive particle. "Width" refers to the maximum dimension of the shaped abrasive particle that is perpendicular to the length. The terms "thickness" or "height" refer to the dimension of the shaped abrasive particle that is perpendicular to the length and width.

Preferably, the ceramic abrasive particles comprise shaped ceramic abrasive particles. Examples of sol-gel-derived shaped alpha alumina (i.e., ceramic) abrasive particles can be found in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina abrasive particles that have been formed in a specific shape, then crushed to form shards that retain a portion of their original shape features. In some embodiments, sol-gel-derived shaped alpha alumina particles are precisely-shaped (i.e., the particles have shapes that are at least partially determined by the shapes of cavities in a production tool used to make them. Details concerning such abrasive particles and methods for their preparation can be found, for example, in U.S. Pat. No. 8,142,531 (Adefris et al.); U.S. Pat. No. 8,142,891 (Culler et al.); and U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

In some preferred embodiments, the abrasive particles comprise shaped ceramic abrasive particles (e.g., shaped sol-gel-derived polycrystalline alpha alumina particles) that are generally triangularly-shaped (e.g., a triangular prism or a truncated three-sided pyramid).

Shaped ceramic abrasive particles are typically selected to have a length in a range of from 1 micron to 15000 microns, more typically 10 microns to about 10000 microns, and still more typically from 150 to 2600 microns, although other lengths may also be used. In some embodiments, the length may be expressed as a fraction of the thickness of the bonded abrasive wheel in which it is contained. For example, the shaped abrasive particle may have a length greater than half the thickness of the bonded abrasive wheel. In some embodiments, the length may be greater than the thickness of the bonded abrasive cut-off wheel.

Shaped ceramic abrasive particles are typically selected to have a width in a range of from 0.1 micron to 3500 microns, more typically 100 microns to 3000 microns, and more typically 100 microns to 2600 microns, although other lengths may also be used.

Shaped ceramic abrasive particles are typically selected to have a thickness in a range of from 0.1 micron to 1600 microns, more typically from 1 micron to 1200 microns, although other thicknesses may be used.

In some embodiments, shaped ceramic abrasive particles may have an aspect ratio (length to thickness) of at least 2, 3, 4, 5, 6, or more.

Surface coatings on the shaped ceramic abrasive particles may be used to improve the adhesion between the shaped ceramic abrasive particles and a binder in abrasive articles, or can be used to aid in electrostatic deposition of the shaped ceramic abrasive particles. In one embodiment, surface coatings as described in U.S. Pat. No. 5,352,254 (Celikkaya) in an amount of 0.1 to 2 percent surface coating to shaped abrasive particle weight may be used. Such surface coatings are described in U.S. Pat. No. 5,213,591 (Celikkaya et al.); U.S. Pat. No. 5,011,508 (Wald et al.); U.S. Pat. No. 1,910, 444 (Nicholson); U.S. Pat. No. 3,041,156 (Rowse et al.); U.S. Pat. No. 5,009,675 (Kunz et al.); U.S. Pat. No. 5,085, 671 (Martin et al.); U.S. Pat. No. 4,997,461 (Markhoff-Matheny et al.); and U.S. Pat. No. 5,042,991 (Kunz et al.). Additionally, the surface coating may prevent the shaped abrasive particle from capping. Capping is the term to describe the phenomenon where metal particles from the workpiece being abraded become welded to the tops of the shaped ceramic abrasive particles. Surface coatings to perform the above functions are known to those of skill in the art.

The abrasive particles may be independently sized according to an abrasives industry recognized specified nominal grade. Exemplary abrasive industry recognized grading standards include those promulgated by ANSI (American National Standards Institute), FEPA (Federation of European Producers of Abrasives), and JIS (Japanese Industrial Standard). ANSI grade designations (i.e., specified nominal grades) include, for example: ANSI 4, ANSI 6, ANSI 8, ANSI 16, ANSI 24, ANSI 36, ANSI 46, ANSI 54, ANSI 60, ANSI 70, ANSI 80, ANSI 90, ANSI 100, ANSI 120, ANSI 150, ANSI 180, ANSI 220, ANSI 240, ANSI 280, ANSI 320, ANSI 360, ANSI 400, and ANSI 600. FEPA grade designations include F4, F5, F6, F7, F8, F10, F12, F14, F16, F16, F20, F22, F24, F30, F36, F40, F46, F54, F60, F70, F80, F90, F100, F120, F150, F180, F220, F230, F240, F280, F320, F360, F400, F500, F600, F800, F1000, F1200, F1500, and F2000. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000

According to an embodiment of the present invention, the average diameter of the abrasive particles may be within a range of from 260 to 1400 microns in accordance with FEPA grades F60 to F24.

Alternatively, the abrasive particles can be graded to a nominal screened grade using U.S.A. Standard Test Sieves conforming to ASTM E-11 "Standard Specification for Wire Cloth and Sieves for Testing Purposes". ASTM E-11 prescribes the requirements for the design and construction of testing sieves using a medium of woven wire cloth mounted in a frame for the classification of materials according to a designated particle size. A typical designation may be represented as −18+20 meaning that the abrasive particles pass through a test sieve meeting ASTM E-11 specifications for the number 18 sieve and are retained on a test sieve meeting ASTM E-11 specifications for the number 20 sieve. In one embodiment, the abrasive particles have a particle size such that most of the particles pass through an 18 mesh test sieve and can be retained on a 20, 25, 30, 35, 40, 45, or 50 mesh test sieve. In various embodiments, the abrasive particles can have a nominal screened grade of: −18+20, −20/+25, −25+30, −30+35, −35+40, 5 −40+45, −45+50, −50+60, −60+70, −70/+80, −80+100, −100+120, −120+140, −140+ 170, −170+200, −200+230, −230+270, −270+325, −325+ 400, −400+450, −450+500, or −500+635. Alternatively, a custom mesh size can be used such as −90+100.

SELECT EMBODIMENTS OF THE PRESENT DISCLOSURE

In a first embodiment, the present disclosure provides an abrasive particle positioning system comprising:
  a production tool comprising:
  a carrier member having a dispensing surface and a back surface opposite the dispensing surface, wherein the carrier member has cavities formed therein, wherein the cavities extend into the carrier member from the dispensing surface toward the back surface, wherein at least a portion of the cavities comprise first, second, third, and fourth consecutive contiguous sidewalls, wherein the first and third sidewalls continuously taper inwardly toward each other and contact each other at a line, and wherein the second and fourth sidewalls do not contact each other; and
  abrasive particles removably and completely disposed within at least some of the cavities.

In a second embodiment, the present disclosure provides the abrasive particle positioning system of the first embodiment, wherein the abrasive particles are removably and completely disposed within at least 80 percent of the cavities.

In a third embodiment, the present disclosure provides the abrasive particle positioning system of the first or second embodiment, wherein the abrasive particles comprise shaped ceramic abrasive particles.

In a fourth embodiment, the present disclosure provides the abrasive particle positioning system of the third embodiment, wherein at least a portion of the shaped ceramic abrasive particles are nominally shaped as truncated three-sided pyramids.

In a fifth embodiment, the present disclosure provides the abrasive particle positioning system of any one of the first to fourth embodiments, wherein the abrasive particles comprise polycrystalline alpha alumina.

In a sixth embodiment, the present disclosure provides the abrasive particle positioning system of any one of the first to fifth embodiments, wherein the first, second, third, and fourth sidewalls are planar.

In a seventh embodiment, the present disclosure provides the abrasive particle positioning system of any one of the first to fifth embodiments, wherein at least one of the first, second, third, or fourth sidewalls is convex.

In an eighth embodiment, the present disclosure provides the abrasive particle positioning system of any one of the first to seventh embodiments, wherein at least a portion of the cavities independently comprise a first chamfer disposed between the dispensing surface and the first sidewall, and a second chamfer disposed between the dispensing surface and the second sidewall, a third chamfers disposed between the dispensing surface and the third sidewall, and a fourth chamfer disposed between the dispensing surface and the fourth sidewall.

In a ninth embodiment, the present disclosure provides the abrasive particle positioning system of any one of the first to eighth embodiments, wherein the carrier member comprises a polymer and is flexible.

In a tenth embodiment, the present disclosure provides the abrasive particle positioning system of any one of the first to ninth embodiments, wherein the production tool comprises an endless belt.

In an eleventh embodiment, the present disclosure provides the abrasive particle positioning system of any one of the first to tenth embodiments, wherein the production tool further comprises a resilient compressible layer secured to the back surface of the carrier member.

In a twelfth embodiment, the present disclosure provides an abrasive particle positioning system comprising:
 a production tool comprising:
  a carrier member having a dispensing surface and a back surface opposite the dispensing surface, wherein the carrier member has cavities formed therein, wherein, on a respective basis, each of the cavities extends from a first opening at the dispensing surface through the carrier member to a second opening at the back surface, and wherein the second opening is smaller than the first opening; and
 abrasive particles removably disposed within at least some of the cavities such that they do not extend beyond the dispensing surface.

In a thirteenth embodiment, the present disclosure provides the abrasive particle positioning system of the twelfth embodiment, wherein the abrasive particles are removably disposed within at least 80 percent of the cavities.

In a fourteenth embodiment, the present disclosure provides the abrasive particle positioning system of the twelfth or thirteenth embodiment, wherein the abrasive particles comprise shaped ceramic abrasive particles.

In a fifteenth embodiment, the present disclosure provides the abrasive particle positioning system of the fourteenth embodiment, wherein at least a portion of the shaped ceramic abrasive particles are nominally shaped as truncated three-sided pyramids.

In a sixteenth embodiment, the present disclosure provides the abrasive particle positioning system of any one of the fourteenth or fifteenth embodiments, wherein the abrasive particles comprise polycrystalline alpha alumina.

In a seventeenth embodiment, the present disclosure provides the abrasive particle positioning system of any one of the twelfth to sixteenth embodiments, wherein:
 at least some of the cavities comprise first, second, third, and fourth consecutive and contiguous sidewalls;
 the first and third sidewalls do not contact each other; and
 the first and third sidewalls taper inwardly from the first opening toward the second opening.

In an eighteenth embodiment, the present disclosure provides the abrasive particle positioning system of the seventeenth embodiment, wherein the second and fourth sidewalls taper inwardly from the first opening toward the second opening.

In a nineteenth embodiment, the present disclosure provides the abrasive particle positioning system of the seventeenth or eighteenth embodiment, wherein the first, second, third, and fourth sidewalls are planar.

In a twentieth embodiment, the present disclosure provides the abrasive particle positioning system of the seventeenth or eighteenth embodiment, wherein at least one of the first, second, third, or fourth sidewalls is convex.

In a twenty-first embodiment, the present disclosure provides the abrasive particle positioning system of any one of the seventeenth to twentieth embodiments, wherein at least a portion of the cavities independently comprise a first chamfer disposed between the dispensing surface and the first sidewall, and a second chamfer disposed between the dispensing surface and the second sidewall, a third chamfers disposed between the dispensing surface and the third sidewall, and a fourth chamfer disposed between the dispensing surface and the fourth sidewall.

In a twenty-second embodiment, the present disclosure provides the abrasive particle positioning system of any one of the twelfth to twenty-first embodiments, wherein at least a portion of the abrasive particles are nominally shaped as truncated three-sided pyramids.

In a twenty-third embodiment, the present disclosure provides the abrasive particle positioning system of any one of the twelfth to twenty-second embodiments, wherein the carrier member comprises a polymer and is flexible.

In a twenty-fourth embodiment, the present disclosure provides the abrasive particle positioning system of any one of the twelfth to twenty-third embodiments, wherein the production tool comprises an endless belt.

In a twenty-fifth embodiment, the present disclosure provides the abrasive particle positioning system of any one of the twelfth to twenty-fourth embodiments, wherein the production tool further comprises a resilient compressible layer secured to the back surface of the carrier member.

In a twenty-sixth embodiment, the present disclosure provides the abrasive particle positioning system of the twenty-fifth embodiment, wherein the resilient compressible layer comprises shaped recesses aligned in registration with respective second openings of each one of at least a portion of the cavities.

In a twenty-seventh embodiment, the present disclosure provides the abrasive particle positioning system of the twenty-fifth embodiment, wherein the resilient compressible layer comprises compressible conduits aligned in registration with respective second openings of at least a portion of the cavities, and wherein the compressible conduits extend through the resilient compressible layer.

In a twenty-eighth embodiment, the present disclosure provides a production tool for precise placement of abrasive particles onto an adhesive substrate, the production tool comprising:
- a carrier member having a dispensing surface and a back surface opposite the dispensing surface, wherein the carrier member has cavities formed therein, wherein on a respective basis each of the cavities extends from a first opening at the dispensing surface through the carrier member to a second opening at the back surface, and wherein the second opening is smaller than the first opening; and
- a resilient compressible layer secured to the back surface of the carrier member.

In a twenty-ninth embodiment, the present disclosure provides the production tool for precise placement of abrasive particles onto an adhesive substrate of the twenty-eighth embodiment, wherein the resilient compressible layer comprises shaped recesses aligned in registration with respective second openings of each one of at least a portion of the cavities.

In a thirtieth embodiment, the present disclosure provides the production tool for precise placement of abrasive particles onto an adhesive substrate of the twenty-eighth embodiment, wherein the resilient compressible layer comprises compressible conduits aligned in registration with respective second openings of at least a portion of the cavities, and wherein the compressible conduits extend through the resilient compressible layer.

In a thirty-first embodiment, the present disclosure provides the production tool for precise placement of abrasive particles onto an adhesive substrate of any one of the twenty-eighth to thirtieth embodiments, wherein:
- at least some of the cavities comprise first, second, third, and fourth consecutive and contiguous sidewalls;
- the first and third sidewalls do not contact each other; and
- the first and third sidewalls taper inwardly from the first opening toward the second opening.

In a thirty-second embodiment, the present disclosure provides the production tool for precise placement of abrasive particles onto an adhesive substrate of the thirty-first embodiment, wherein the first, second, third, and fourth sidewalls are planar.

In a thirty-third embodiment, the present disclosure provides the production tool for precise placement of abrasive particles onto an adhesive substrate of the thirty-first embodiment, wherein at least one of the first, second, third, or fourth sidewalls is convex.

In a thirty-fourth embodiment, the present disclosure provides the production tool for precise placement of abrasive particles onto an adhesive substrate of any one of the thirty-first to thirty-third embodiments, wherein at least a portion of the cavities independently comprise a first chamfer disposed between the dispensing surface and the first sidewall, and a second chamfer disposed between the dispensing surface and the second sidewall, a third chamfers disposed between the dispensing surface and the third sidewall, and a fourth chamfer disposed between the dispensing surface and the fourth sidewall.

In a thirty-fifth embodiment, the present disclosure provides the production tool for precise placement of abrasive particles onto an adhesive substrate of any one of the twenty-eighth to thirty-fourth embodiments, wherein the carrier member comprises a polymer and is flexible.

In a thirty-sixth embodiment, the present disclosure provides the production tool for precise placement of abrasive particles onto an adhesive substrate of any one of the twenty-eighth to thirty-fifth embodiments, wherein the carrier member comprises an endless belt.

In a thirty-seventh embodiment, the present disclosure provides a production tool for precise placement of abrasive particles onto an adhesive substrate, the production tool comprising a carrier member having a dispensing surface and a back surface opposite the dispensing surface, wherein the carrier member has cavities formed therein, and wherein the carrier member comprises at least two longitudinally-oriented raised standoff members disposed on the dispensing surface.

In a thirty-eighth embodiment, the present disclosure provides the production tool for precise placement of abrasive particles onto an adhesive substrate of the thirty-seventh embodiment, wherein at least one of the at least two longitudinally-oriented raised standoff members is continuous.

In a thirty-ninth embodiment, the present disclosure provides the production tool for precise placement of abrasive particles onto an adhesive substrate of the thirty-seventh or thirty eighth embodiment, wherein the dispensing surface has first and second opposed edges along its length, wherein the at least two longitudinally-oriented raised standoff members comprise first and second longitudinally-oriented raised standoff members, wherein the first longitudinally-oriented raised standoff member is adjacent to the first edge of the dispensing surface, and the second longitudinally-oriented raised standoff member is adjacent to the first edge of the dispensing surface.

In a fortieth embodiment, the present disclosure provides the production tool for precise placement of abrasive particles onto an adhesive substrate of the thirty-seventh to thirty-ninth embodiments, wherein the at least two longitudinally-oriented raised standoff members comprise first and second longitudinally-oriented raised standoff members, wherein the at least two longitudinally-oriented raised standoff members further comprise a third longitudinally-oriented raised standoff member disposed between, and parallel to, the first and second longitudinally-oriented raised standoff members.

In a forty-first embodiment, the present disclosure provides the production tool for precise placement of abrasive particles onto an adhesive substrate of the thirty-seventh to fortieth embodiments, wherein the cavities extend into the carrier member from the dispensing surface toward the back surface, wherein at least a portion of the cavities comprise first, second, third, and fourth contiguous sidewalls.

In a forty-second embodiment, the present disclosure provides the production tool for precise placement of abrasive particles onto an adhesive substrate of the forty-first embodiment, wherein the first and third sidewalls continuously taper inwardly toward each other and contact each other at a line.

In a forty-third embodiment, the present disclosure provides the production tool for precise placement of abrasive particles onto an adhesive substrate of the forty-first embodiment, wherein the second and fourth sidewalls do not contact each other.

In a forty-fourth embodiment, the present disclosure provides the production tool for precise placement of abrasive particles onto an adhesive substrate of any one of the forty-first to forty-third embodiments, wherein the first, second, third, and fourth sidewalls are planar.

In a forty-fifth embodiment, the present disclosure provides the production tool for precise placement of abrasive particles onto an adhesive substrate of any one of the forty-first to forty-third embodiments, wherein at least one of the first, second, third, or fourth sidewalls is convex.

In a forty-sixth embodiment, the present disclosure provides the production tool for precise placement of abrasive particles onto an adhesive substrate of any one of the forty-first to forty-fifth embodiments, wherein at least a portion of the cavities independently comprise a first chamfer disposed between the dispensing surface and the first sidewall, and a second chamfer disposed between the dispensing surface and the second sidewall, a third chamfers disposed between the dispensing surface and the third sidewall, and a fourth chamfer disposed between the dispensing surface and the fourth sidewall.

In a forty-seventh embodiment, the present disclosure provides the production tool for precise placement of abrasive particles onto an adhesive substrate of any one of the thirty-seventh to forty-sixth embodiments, wherein the carrier member comprises a polymer and is flexible.

In a forty-eighth embodiment, the present disclosure provides the production tool for precise placement of abrasive particles onto an adhesive substrate of any one of the thirty-seventh to forty-seventh embodiments, wherein the production tool comprises an endless belt.

In a forty-ninth embodiment, the present disclosure provides the production tool for precise placement of abrasive particles onto an adhesive substrate of any one of the thirty-seventh to forty-eighth embodiments, further comprising a resilient compressible layer secured to the back surface of the carrier member.

In a fiftieth embodiment, the present disclosure provides the production tool for precise placement of abrasive particles onto an adhesive substrate of the forty-ninth embodiment, wherein the resilient compressible layer comprises shaped recesses aligned in registration with respective second openings of each one of at least a portion of the cavities.

In a fifty-first embodiment, the present disclosure provides the production tool for precise placement of abrasive particles onto an adhesive substrate of the forty-ninth embodiment, wherein the resilient compressible layer comprises compressible conduits aligned in registration with respective second openings of at least a portion of the cavities, and wherein the compressible conduits extend through the resilient compressible layer.

In a fifty-second embodiment, the present disclosure provides a coated abrasive article maker apparatus comprising:
 a first web path for a production tool having a dispensing surface with a plurality of cavities, the first web path guiding the production tool through the coated abrasive article maker apparatus such that it wraps a portion of the outer circumference of an abrasive particle transfer roll;
 a second web path for a resin coated backing guiding the resin coated backing through the coated abrasive article maker apparatus such that it wraps a portion of the outer circumference of the abrasive particle transfer roll with the resin layer positioned facing the dispensing surface and the production tool positioned between the resin coated backing and the outer circumference of the abrasive particle transfer roll; and
 an abrasive particle feeder, positioned prior to the abrasive particle transfer roll in the direction of travel of the production tool along the first web path, to dispense abrasive particles onto the dispensing surface and into the plurality of cavities; and
 wherein abrasive particles are transferred from the plurality of cavities to the resin coated backing as the resin coated backing and the production tool traverse around the abrasive particle transfer roll.

In a fifty-third embodiment, the present disclosure provides the coated abrasive article maker apparatus of the fifty-second embodiment, wherein the production tool comprises a carrier member having the dispensing surface and a back surface opposite the dispensing surface, wherein the carrier member has the plurality of cavities formed therein, wherein the plurality of cavities extend into the carrier member from the dispensing surface toward the back surface, wherein at least a portion of the plurality of cavities comprise first, second, third, and fourth consecutive contiguous sidewalls, wherein the first and third sidewalls continuously taper inwardly toward each other and contact each other at a line, and wherein the second and fourth sidewalls do not contact each other.

In a fifty-fourth embodiment, the present disclosure provides the coated abrasive article maker apparatus of the fifty-second embodiment, wherein the production tool comprises a carrier member having the dispensing surface and a back surface opposite the dispensing surface, wherein the carrier member has the plurality of cavities formed therein, wherein, on a respective basis, each of the cavities extends from a first opening at the dispensing surface through the carrier member to a second opening at the back surface, and wherein the second opening is smaller than the first opening.

In a fifty-fifth embodiment, the present disclosure provides the coated abrasive article maker apparatus of the fifty-second embodiment, wherein the production tool comprises a carrier member having the dispensing surface, a back surface opposite the dispensing surface, and a resilient compressible layer secured to the back surface of the carrier member; and wherein the carrier member has the plurality of cavities formed therein, wherein on a respective basis each of the cavities extends from a first opening at the dispensing surface through the carrier member to a second opening at the back surface, and wherein the second opening is smaller than the first opening.

In a fifty-sixth embodiment, the present disclosure provides the coated abrasive article maker apparatus of the fifty-fifth embodiment, wherein the resilient compressible layer comprises a plurality of apertures and wherein each of the apertures is aligned with a one of the cavities such that an opening extends from the dispensing surface through the carrier member and through the resilient compressible layer.

In a fifty-seventh embodiment, the present disclosure provides the coated abrasive article maker apparatus of the fifty-second embodiment, wherein the production tool comprises a carrier member having the dispensing surface and a back surface opposite the dispensing surface, wherein the carrier member has cavities formed therein, and wherein the carrier member comprises at least two longitudinally-oriented raised standoff members disposed on the dispensing surface.

In a fifty-eighth embodiment, the present disclosure provides the coated abrasive article maker apparatus of any one of the fifty-second to fifty-seventh embodiments, comprising a filling assist member positioned between the abrasive particle transfer roll and the abrasive particle feeder in the direction of travel of the production tool along the first web path to move abrasive particles on the dispensing surface into the cavities.

In a fifty-ninth embodiment, the present disclosure provides the coated abrasive article maker apparatus of the fifty-eighth embodiment, wherein the filling assist member comprises a brush.

In a sixtieth embodiment, the present disclosure provides the coated abrasive article maker apparatus of any one of the fifty-second to fifty-ninth embodiments, comprising an abrasive particle removal member positioned between the abrasive particle transfer roll and the abrasive particle feeder in the direction of travel of the production tool along the first web path to remove excess abrasive particles from the dispensing surface.

In a sixty-first embodiment, the present disclosure provides the coated abrasive article maker apparatus of the sixtieth embodiment, wherein the abrasive particle removal member comprises an air knife to blow excess abrasive particles from the dispensing surface.

In a sixty-second embodiment, the present disclosure provides the coated abrasive article maker apparatus of any one of the fifty-second to sixty-first embodiments, wherein the dispensing surface is inclined after the abrasive particle feeder such the elevation of the plurality of cavities increases in the direction of travel of the production tool along the first web path.

In a sixty-third embodiment, the present disclosure provides the coated abrasive article maker apparatus of any one of the fifty-second to sixty-second embodiments, wherein the dispensing surface is inverted as the production tool wraps the abrasive particle transfer roll.

In a sixty-fourth embodiment, the present disclosure provides the coated abrasive article maker apparatus of any one of the fifty-second to sixty-third embodiments, wherein a vibration source is coupled to the abrasive particle transfer roll.

In a sixty-fifth embodiment, the present disclosure provides the coated abrasive article maker apparatus of the fifty-fourth embodiment, wherein the abrasive particle transfer roll has an elastomeric outer circumference.

In a sixty-sixth embodiment, the present disclosure provides the coated abrasive article maker apparatus of the fifty-fourth embodiment, wherein the abrasive particle transfer roll has a plurality of apertures in the outer circumference in fluid communication with an internal source of pressurized air contained within the abrasive particle transfer roll.

In a sixty-seventh embodiment, the present disclosure provides the coated abrasive article maker apparatus of the fifty-fourth embodiment, comprising a vacuum box located adjacent to the back surface positioned near the abrasive particle feeder.

In a sixty-eighth embodiment, the present disclosure provides a coated abrasive article maker apparatus comprising:
  a production tool having a dispensing surface with a plurality of cavities located on the outer circumference of an abrasive particle transfer roll;
  a web path for a resin coated backing guiding the resin coated backing through the coated abrasive article maker apparatus such that it wraps a portion of the outer circumference of the abrasive particle transfer roll with the resin layer positioned facing the dispensing surface; and
  an abrasive particle feeder, to dispense abrasive particles onto the dispensing surface and into the plurality of cavities; and
  wherein abrasive particles are transferred from the plurality of cavities to the resin coated backing as they traverse around the abrasive particle transfer roll.

In a sixty-ninth embodiment, the present disclosure provides the coated abrasive article maker apparatus of the sixty-eighth embodiment, wherein the production tool comprises a sleeve positioned on the outer circumference of the abrasive particle transfer roll.

In a seventieth embodiment, the present disclosure provides the coated abrasive article maker apparatus of the sixty-eighth embodiment, wherein the plurality of cavities are formed in the outer surface the abrasive particle transfer roll.

In a seventy-first embodiment, the present disclosure provides the coated abrasive article maker apparatus of any one of the sixty-eighth to seventieth embodiments, wherein the abrasive particle feeder is positioned to dispense abrasive particles onto the dispensing surface prior to top dead center of the abrasive particle transfer roll with respect to its direction of rotation.

In a seventy-second embodiment, the present disclosure provides the coated abrasive article maker apparatus of the seventy-first embodiment, comprising an abrasive particle retaining member positioned adjacent to the dispensing surface prior to top dead center of the abrasive particle transfer roll with respect to its direction of rotation to retard the freefall of the abrasive particles supplied to the dispensing surface by the abrasive particle feeder.

In a seventy-third embodiment, the present disclosure provides the coated abrasive article maker apparatus of the seventy-second embodiment, wherein abrasive particle retaining member comprises an inclined plate excess abrasive particles slide down.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Examples 1-2 and Comparative Examples A-B

Coated abrasive articles of Examples 1 and 2 and Comparative Examples A and B were fiber discs prepared and tested as described below.

Example 1

Shaped abrasive particles were prepared according to the disclosure of U.S. Pat. No. 8,142,531 (Adefris et al.) The shaped abrasive particles were prepared by molding alumina sol gel in equilateral triangle-shaped polypropylene mold cavities of side length 0.110 inch (2.8 mm) and a mold depth of 0.028 inch (0.71 mm) The fired shaped abrasive particles were about 1.37 mm (side length)×0.027 mm thick and would pass through an ASTM 16 (Tyler equivalent 14)-mesh sieve.

A make resin was prepared by mixing 49 parts resole phenolic resin (based-catalyzed condensate from 1.5:1 to 2.1:1 molar ratio of phenol:formaldehyde), 41 parts calcium carbonate (HUBERCARB, Huber Engineered Materials, Quincy, Ill.) and 10 parts water were added with mixing. 3.8 grams of this mixture was then applied via a brush to a 7 in (17.8 cm) diameter×0.83 mm thick vulcanized fiber web (DYNOS VULCANIZED FIBRE, DYNOS GmbH, Troisdorf, Germany) having a 0.875 in (2.22 cm) center hole.

A production tool having vertically-oriented triangular openings generally configured as shown in FIGS. 3A-3C (wherein length=1.875 mm, width=0.785 mm, depth=1.62 mm, bottom width=0.328 mm) arranged in a rectangular array (length-wise pitch=1.978 mm, width-wise pitch=0.886 mm) with all long dimensions in the same direction) was then filled with the shaped abrasive particles assisted by tapping. Shaped abrasive particles in excess of those accommodated into the tool's cavities were removed by brushing. The shaped abrasive particle-containing production tool was then brought to close proximity and alignment to the adhesive coated disc and inverted to deposit the shaped abrasive particles in a precise spaced and oriented pattern on the adhesive coated disc. About 57 particles per cm$^2$ were applied.

The weight of the shaped abrasive particles transferred to each disc was 7.3 grams. The make coat resin was thermally cured (70° C. for 45 minutes, 90° C. for 45 minutes, followed by 105° C. for 3 hours). Each disc was then coated with a conventional cryolite-containing phenolic size resin and cured (70° C. for 45 minutes, 90° C. for 45 minutes, followed by 105° C. for 3 hours). Each disc was then coated with a conventional KBF$_4$-containing supersize resin and cured (70° C. for 45 minutes, 90° C. for 45 minutes, followed by 105° C. for 15 hours).

The finished coated abrasive discs were allowed to equilibrate at ambient humidity for a week followed by 2 days at 50% RH before testing. Results from the Abrasive Disc Test are reported in Table 1.

Example 2

The abrasive article of Example 2 was prepared identically to Example 1, except that the production tool had shaped cavities arranged in a regular radial array with the length direction perpendicular to the radial direction. About 38 particles per cm$^2$ were thus applied.

Comparative Example A

Comparative Example A was a fiber disc containing crushed ceramic alumina grain, commercially available as 3M 985C FIBER DISC, GRADE 36, 7 INCH from 3M Company, Saint Paul, Minn.

Comparative Example B

Comparative Example B was a fiber disc containing shaped abrasive particles of ceramic alumina, commercially available as 3M 987C FIBER DISC, GRADE 36+, 7 INCH from 3M Company.

Abrasive Disc Test

The Abrasive Disc Test simulates abrasive efficacy to level and blend a weld bead into a workpiece. A 7 in (18 cm) diameter fiber disc to be evaluated was mounted on a right angle grinder (CLECO 1760BVL, 3 HP) using a 6.5 in (16.5 cm) red ribbed backup plate (3M PART NO. 051144-80514). The workpieces were pre-weighed pairs of stainless steel (304L plate, 6 in (15.2 cm)×12 in (30.5 cm)×⅜ in (0.95 cm) thick that were free from oil and scale. One of the stainless steel workpieces was secured to expose a 6 in (15.2 cm)×12 in (30.5 cm) face for grinding, and the other was secured to expose a ⅜ in (0.95 cm)×12 in (30.5 cm) face for grinding. The right angle grinder was activated and the abrasive disc was urged against the 6 in (15.2 cm)×12 in (30.5 cm) face for 45 seconds, followed by 15 seconds against the ⅜ in (0.95 cm)×12 in (30.5 cm) face. The pairs of workpieces were weighed again to determine the amount of material removed during this first grinding cycle and then cooled in water and dried. This grinding cycle was then repeated until the amount of material removed was 50% of that of the first grinding cycle. Test results are reported as cut (grams of metal removed) vs. test cycle number.

TABLE 1

| TEST CYCLE | EXAMPLE 1 | EXAMPLE 2 | COMPARATIVE EXAMPLE A | COMPARATIVE EXAMPLE B |
|---|---|---|---|---|
| | | | CUT, grams | |
| 1 | 82 | 127 | 76 | 82 |
| 2 | 96 | 98 | 53 | 83 |
| 3 | 83 | 82 | 36 | 69 |
| 4 | 64 | 65 | — | 52 |
| 5 | 53 | 55 | — | 38 |
| 6 | 39 | 53 | — | — |

Examples 3-5 and Comparative Example C

Examples 3-5 and Comparative Example C were coated abrasive belts and were prepared and tested as described below.

Example 3

Untreated polyester cloth having a weight of 300-400 grams per square meter (g/m$^2$), obtained under the trade designation POWERSTRAIT from Milliken & Company, Spartanburg, S.C., was presized with a composition consisting of 75 parts EPON 828 epoxy resin (bisphenol A diglycidyl ether, from Resolution Performance Products, Houston, Tex.), 10 parts of trimethylolpropane triacrylate (obtained as SR351 from Cytec Industrial Inc., Woodland Park, N.J.), 8 parts of dicyandiamide curing agent (obtained as DICYANEX 1400B from Air Products and Chemicals, Allentown, Pa.), 5 parts of novolac resin (obtained as RUTAPHEN 8656 from Momentive Specialty Chemicals Inc., Columbus, Ohio), 1 part of 2,2-dimethoxy-2-phenylacetophenone (obtained as IRGACURE 651 photoinitiator from BASF Corp., Florham Park, N.J.), and 0.75 part of 2-propylimidazole (obtained as ACTIRON NXJ-60 LIQUID from Synthron, Morganton, N.C.). A 10.16 cm×114.3 cm strip of this backing was taped to a 15.2 cm×121.9 cm×1.9 cm thick laminated particle board. The cloth backing was coated with 183 g/m$^2$ of phenolic make resin consisting of 52 parts of resole phenolic resin (obtained as GP 8339 R-23155B from Georgia Pacific Chemicals, Atlanta, Ga.), 45 parts of calcium metasilicate (obtained as WOLLASTO- COAT from NYCO Company, Willsboro, N.Y.), and 2.5 parts of water using a putty knife to fill the backing weave and remove excess resin. The abrasive particles (shaped abrasive particles prepared according to the disclosure of U.S. Pat. No. 8,142,531 (Adefris et al.) having nominal equal side lengths of 1.30 mm and a thickness of 0.27 mm, and a sidewall angle of 98 degrees) were filled into a 6.35×10.16 cm production tool with an array of vertically-oriented triangular openings generally configured as shown in FIGS. 3A-3C (wherein length=1.698 mm, width=0.621 mm, depth=1.471 mm, bottom width=0.363 mm) arranged in a rectangular array (length-wise pitch=2.68 mm, width-wise pitch=1.075 mm) with their long dimensions aligned at a 2 degree angle relative to the longitudinal dimension of the backing (i.e., nearly parallel), using vibration and a brush to remove excess mineral. Eleven such tools were lined up long end to long end and mounted to a second 15.2 cm×121.9 cm×1.9 cm thick particle board to ensure that at least a 111 cm strip of abrasive coating was generated. A 1.0 cm diameter hole was drilled through the thickness at the midpoint of the 15.2 cm dimension and approximately 2.54 cm from each end of both of the laminated particle boards. A base was constructed that had a 0.95-cm diameter vertical dowels at each end to engage the holes in the particle boards and thereby align the placement of first the abrasive particle filled tooling (open side up), followed by the make resin-coated backing (coated side down). Several spring clamps were attached to the particle boards to hold the construction together. The clamped assembly was removed from the dowels, flipped over (backing now coated side up and tooling open side down) and placed back onto the base using the dowels to maintain alignment. The back of the laminated particle board was repeatedly tapped lightly with a hammer to transfer about 35 abrasive particles per cm² to the make-coated backing. The spring clamps were removed and the top board carefully removed from the dowels so the transferred mineral was not knocked over on its side. The tape was removed and the abrasive coated backing and it was placed in an oven at 90° C. for 1.5 hours to partially cure the make resin. A size resin (756 g/m²) consisting of 29.42 parts of resole phenolic resin (obtained as GP 8339 R-23155B from Georgia Pacific Chemicals, Atlanta, Ga.), 18.12 parts of water, 50.65 parts of cryolite (obtained as RTN Cryolite from TR International Trading Co., Houston, Tex.), 59 parts of grade 40 FRPL brown aluminum oxide (obtained from Treibacher Schleifinittel AG, Villach, Austria) and 1.81 parts of surfactant (obtained as EMULON A from BASF Corp., Mount Olive, N.J.) was brushed on, and the coated strip was placed in an oven at 90° C. for 1 hour, followed by and 8 hour final cure at 102° C. After cure, the strip of coated abrasive was converted into a belt using conventional adhesive splicing practices.

Example 4

Example 4 was prepared identically to Example 3, except that the tooling cavities were positioned with their long dimension perpendicular to the long dimension of the backing.

Example 5

Example 5 was a replicate of Example 4.
Abrasive Belt Test
The Abrasive Belt Test was used to evaluate the efficacy of inventive and comparative abrasive belts. Test belts were of dimension 10.16 cm×91.44 cm. The workpiece was a 304 stainless steel bar that was presented to the abrasive belt along its 1.9 cm×1.9 cm end. A 20.3 cm diameter, 70 durometer Shore A, serrated (1:1 land to groove ratio) rubber contact wheel was used. The belt was driven to 5500 SFM. The workpiece was urged against the center part of the belt at a blend of normal forces from 10 to 15 pounds (4.53 to 6.8 kg). The test consisted of measuring the weight loss of the workpiece after 15 seconds of grinding (1 cycle). The workpiece was then cooled and tested again. The test was concluded after 60 test cycles. The cut in grams was recorded after each cycle. The test results are reported in Table 2 (below).

TABLE 2

| CYCLE | EXAMPLE 3 | EXAMPLE 4 | EXAMPLE 5 |
|---|---|---|---|
| | | CUT, grams | |
| 1 | 32.60 | 22.15 | 19.86 |
| 2 | 33.25 | 18.01 | 15.78 |
| 3 | 33.74 | 16.59 | 14.55 |
| 4 | 33.00 | 15.84 | 14.41 |
| 5 | 32.72 | 15.25 | 14.13 |
| 6 | 31.33 | 15.02 | 13.64 |
| 7 | 30.86 | 14.93 | 13.61 |
| 8 | 29.76 | 14.97 | 13.94 |
| 9 | 28.56 | 15.38 | 13.92 |
| 10 | 26.91 | 15.61 | 13.06 |
| 11 | 26.32 | 15.35 | 14.00 |
| 12 | 24.84 | 15.72 | 14.29 |
| 13 | 24.23 | 15.47 | 14.16 |
| 14 | 23.29 | 15.11 | 13.50 |
| 15 | 22.75 | 14.69 | 13.47 |
| 16 | 21.71 | 15.27 | 13.58 |
| 17 | 20.30 | 15.18 | 14.00 |
| 18 | 19.57 | 14.80 | 14.08 |
| 19 | 18.54 | 14.75 | 13.91 |
| 20 | 17.72 | 14.75 | 13.80 |
| 21 | 16.84 | 15.25 | 13.56 |
| 22 | 16.17 | 14.35 | 13.15 |
| 23 | 15.06 | 14.24 | 13.67 |
| 24 | 14.33 | 14.44 | 13.79 |
| 25 | 14.12 | 14.49 | 13.56 |
| 26 | 13.63 | 14.48 | 13.26 |
| 27 | 13.25 | 14.35 | 13.00 |
| 28 | 12.64 | 14.35 | 12.96 |
| 29 | 12.27 | 13.99 | 12.96 |
| 30 | 11.88 | 14.52 | 13.14 |
| 31 | 11.67 | 13.83 | 12.65 |
| 32 | 11.08 | 13.83 | 12.19 |
| 33 | 10.67 | 13.62 | 11.93 |
| 34 | 10.40 | 13.15 | 11.99 |
| 35 | 10.11 | 12.79 | 12.60 |
| 36 | 9.59 | 12.94 | 12.11 |
| 37 | 9.28 | 13.18 | 11.44 |
| 38 | 8.92 | 12.88 | 11.46 |
| 39 | 8.71 | 12.59 | 11.43 |
| 40 | 8.53 | 12.30 | 11.22 |
| 41 | 8.47 | 12.37 | 11.04 |
| 42 | 8.18 | 12.35 | 11.28 |
| 43 | 8.06 | 12.51 | 11.36 |
| 44 | 7.87 | 12.29 | 11.21 |
| 45 | 7.79 | 12.06 | 11.1 |
| 46 | 7.74 | 11.78 | 11.05 |
| 47 | 7.58 | 11.8 | 10.34 |
| 48 | 7.58 | 11.17 | 10.09 |
| 49 | 7.50 | 11.08 | 9.91 |
| 50 | 7.31 | 11.31 | 9.80 |
| 51 | 7.27 | 11.22 | 9.61 |
| 52 | 7.07 | 11.15 | 9.44 |
| 53 | 6.89 | 11.41 | 9.63 |
| 54 | 6.86 | 11.41 | 9.45 |
| 55 | 6.83 | 10.94 | 9.29 |
| 56 | 6.83 | 10.95 | 9.27 |
| 57 | 6.58 | 11.17 | 9.36 |
| 58 | 6.54 | 11.26 | 9.37 |
| 59 | 6.45 | 11.23 | 9.27 |
| 60 | 6.31 | 10.91 | 9.49 |

All cited references, patents, or patent applications in the above application for letters patent are herein incorporated by reference in their entirety, or specified portion thereof, in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A coated abrasive article maker apparatus comprising:
a first web path for a production tool having a dispensing surface with a plurality of cavities, the first web path guiding the production tool through the coated abrasive article maker apparatus such that it wraps a portion of the outer circumference of an abrasive particle transfer roll;
a second web path for a resin coated backing guiding the resin coated backing through the coated abrasive article maker apparatus such that it wraps a portion of the outer circumference of the abrasive particle transfer roll with the resin layer positioned facing the dispensing surface and the production tool positioned between the resin coated backing and the outer circumference of the abrasive particle transfer roll; and
an abrasive particle feeder, positioned prior to the abrasive particle transfer roll in the direction of travel of the production tool along the first web path, to dispense abrasive particles onto the dispensing surface and into the plurality of cavities; and
wherein abrasive particles are transferred from the plurality of cavities to the resin coated backing as the resin coated backing and the production tool traverse around the abrasive particle transfer roll.

2. The coated abrasive article maker apparatus of claim 1 wherein the production tool comprises a carrier member having the dispensing surface and a back surface opposite the dispensing surface, wherein the carrier member has the plurality of cavities formed therein, wherein the plurality of cavities extend into the carrier member from the dispensing surface toward the back surface, wherein at least a portion of the plurality of cavities comprise first, second, third, and fourth consecutive contiguous sidewalls, wherein the first and third sidewalls continuously taper inwardly toward each other and contact each other at a line, and wherein the second and fourth sidewalls do not contact each other.

3. The coated abrasive article maker apparatus of claim 1 wherein the production tool comprises a carrier member having the dispensing surface and a back surface opposite the dispensing surface, wherein the carrier member has the plurality of cavities formed therein, wherein, on a respective basis, each of the cavities extends from a first opening at the dispensing surface through the carrier member to a second opening at the back surface, and wherein the second opening is smaller than the first opening.

4. The coated abrasive article maker apparatus of claim 1 wherein the production tool comprises a carrier member having the dispensing surface, a back surface opposite the dispensing surface, and a resilient compressible layer secured to the back surface of the carrier member; and wherein the carrier member has the plurality of cavities formed therein, wherein on a respective basis each of the cavities extends from a first opening at the dispensing surface through the carrier member to a second opening at the back surface, and wherein the second opening is smaller than the first opening.

5. The coated abrasive article maker apparatus of claim 4 wherein the resilient compressible layer comprises a plurality of apertures and wherein each of the apertures is aligned with a one of the cavities such that an opening extends from the dispensing surface through the carrier member and through the resilient compressible layer.

6. The coated abrasive article maker apparatus of claim 1 wherein the production tool comprises a carrier member having the dispensing surface and a back surface opposite the dispensing surface, wherein the carrier member has cavities formed therein, and wherein the carrier member comprises at least two longitudinally-oriented raised stand-off members disposed on the dispensing surface.

7. The coated abrasive article maker apparatus of claim 6 comprising a filling assist member positioned between the abrasive particle transfer roll and the abrasive particle feeder in the direction of travel of the production tool along the first web path to move abrasive particles on the dispensing surface into the cavities.

8. The coated abrasive article maker apparatus of claim 7 wherein the filling assist member comprises a brush.

9. The coated abrasive article maker apparatus of claim 8 comprising an abrasive particle removal member positioned between the abrasive particle transfer roll and the abrasive particle feeder in the direction of travel of the production tool along the first web path to remove excess abrasive particles from the dispensing surface.

10. The coated abrasive article maker of claim 9 wherein the abrasive particle removal member comprises an air knife to blow excess abrasive particles from the dispensing surface.

11. The coated abrasive article maker apparatus of claim 8 wherein the dispensing surface is inclined after the abrasive particle feeder such the elevation of the plurality of cavities increases in the direction of travel of the production tool along the first web path.

12. The coated abrasive article maker apparatus of claim 11 wherein the dispensing surface is inverted as the production tool wraps the abrasive particle transfer roll.

13. The coated abrasive article maker apparatus of claim 12 wherein a vibration source is coupled to the abrasive particle transfer roll.

14. The coated abrasive article maker of claim 3 wherein the abrasive particle transfer roll has an elastomeric outer circumference.

15. The coated abrasive article maker of claim 3 wherein the abrasive particle transfer roll has a plurality of apertures in the outer circumference in fluid communication with an internal source of pressurized air contained within the abrasive particle transfer roll.

16. The coated abrasive article maker of claim 3 comprising a vacuum box located adjacent to the back surface positioned near the abrasive particle feeder.

* * * * *

UNITED STATES PATENT AND TRADEMARK OFFICE
CERTIFICATE OF CORRECTION

PATENT NO. : 10,518,388 B2  
APPLICATION NO. : 15/106213  
DATED : December 31, 2019  
INVENTOR(S) : Culler et al.

Page 1 of 1

It is certified that error appears in the above-identified patent and that said Letters Patent is hereby corrected as shown below:

On the Title Page

Item (57) (abstract), Line 8, delete "this" and insert -- that --, therefor.

In the Specification

Column 8, Line 14, after "backing" insert -- . --.

Column 16, Line 44, after "degrees" insert -- . --.

Column 17, Line 67, after "sidewalls" insert -- . --.

Column 21, Line 49, delete "may be may be" and insert -- may be --, therefor.

Column 24, Line 19, after "JIS10,000" insert -- . --.

Column 24, Line 41, delete "5 -40+45," and insert -- -40+45, --.

Column 32, Line 59, after "mm)" insert -- . --.

Column 35, Line 46 (approx.), delete "Schleifinittel" and insert -- Schleifmittel --, therefor.

Signed and Sealed this  
Twenty-fourth Day of November, 2020

Andrei Iancu  
*Director of the United States Patent and Trademark Office*